US008149283B2

(12) United States Patent
Doida

(10) Patent No.: US 8,149,283 B2
(45) Date of Patent: Apr. 3, 2012

(54) IMAGE PROCESSING DEVICE, ELECTRONIC CAMERA, IMAGE PROCESSING METHOD, AND IMAGE PROCESSING PROGRAM

(75) Inventor: Shigeru Doida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 273 days.

(21) Appl. No.: 12/312,983

(22) PCT Filed: Jan. 17, 2008

(86) PCT No.: PCT/JP2008/000037
§ 371 (c)(1),
(2), (4) Date: Jun. 3, 2009

(87) PCT Pub. No.: WO2008/090730
PCT Pub. Date: Jul. 31, 2008

(65) Prior Publication Data
US 2010/0026825 A1   Feb. 4, 2010

(30) Foreign Application Priority Data

Jan. 23, 2007  (JP) .................... 2007-012516
May 22, 2007  (JP) .................... 2007-135300
Jul. 4, 2007   (JP) .................... 2007-175972

(51) Int. Cl.
H04N 5/228    (2006.01)
H04N 5/235    (2006.01)
(52) U.S. Cl. ................. 348/208.12; 348/221.1
(58) Field of Classification Search ........... 348/208.4, 348/208.6, 208.12, 208.13, 220.1, 221.1
See application file for complete search history.

(56) References Cited

U.S. PATENT DOCUMENTS

| 5,754,692 A | 5/1998 | Kondo et al. |
| 6,738,510 B2* | 5/2004 | Tsuruoka et al. ........... 382/167 |
| 7,889,264 B2* | 2/2011 | Robinson .................. 348/342 |
| 2002/0167592 A1 | 11/2002 | Toyoda et al. |
| 2004/0004666 A1* | 1/2004 | Sano ........................ 348/254 |

(Continued)

FOREIGN PATENT DOCUMENTS

JP    A-05-130339    5/1993

(Continued)

OTHER PUBLICATIONS

Office Action issued May 17, 2011 in Japanese Patent Application No. 2007-012516.

Primary Examiner — Daniel M Pasiewicz
(74) Attorney, Agent, or Firm — Oliff & Berridge, PLC

(57) ABSTRACT

To provide a technique to obtain a synthesized image with an expanded dynamic range with ease and a technique to reduce workload of a user while maintaining the degree of freedom relating to image processing. There provides an image inputting part taking in at least one of a plurality of low-resolution images and a high-resolution image obtained by shooting the same subject while changing exposure condition, a shift detecting part detecting a positional shift of pictorial pattern between each of the plurality of low-resolution images and the high-resolution image, and a gradation expanding part generating a synthesized image in which a range of reproduced gradation is expanded by performing position alignment between each of the plurality of low-resolution images and the high-resolution image based on the positional shift, extracting a gradation information of the plurality of low-resolution images, and synthesizing it with the high-resolution image.

13 Claims, 19 Drawing Sheets

U.S. PATENT DOCUMENTS

| | | |
|---|---|---|
| 2005/0057687 A1 | 3/2005 | Irani et al. |
| 2005/0219642 A1 | 10/2005 | Yachida et al. |
| 2009/0052788 A1 | 2/2009 | Doida |

FOREIGN PATENT DOCUMENTS

| | | |
|---|---|---|
| JP | A-2002-237988 | 8/2002 |
| JP | A-2002-305684 | 10/2002 |
| JP | A-2003-046859 | 2/2003 |
| JP | A-2005-515675 | 5/2005 |
| JP | A-2005-318548 | 11/2005 |
| JP | A-2005-345715 | 12/2005 |
| JP | A-2006-270238 | 10/2006 |
| JP | 2007-006021 | 1/2007 |
| WO | WO 95/04329 A1 | 2/1995 |

\* cited by examiner

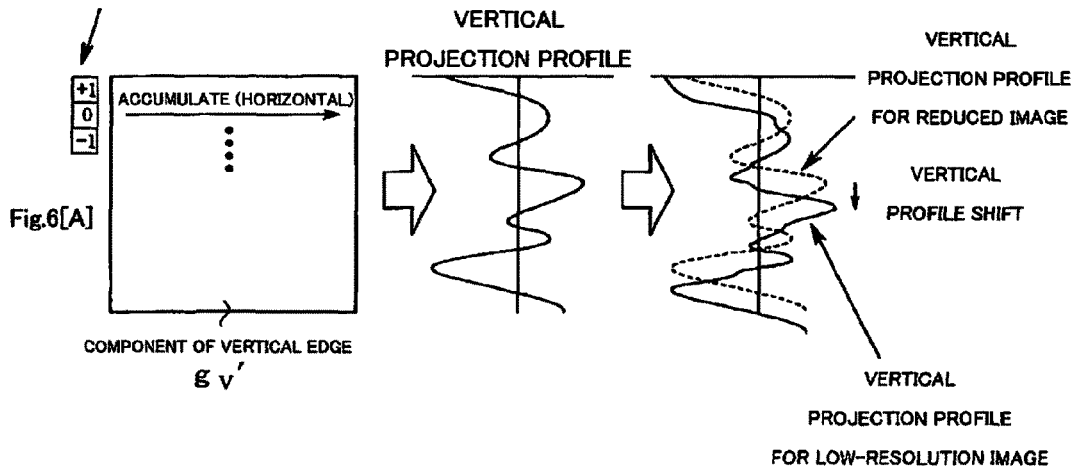
Fig.6[A]
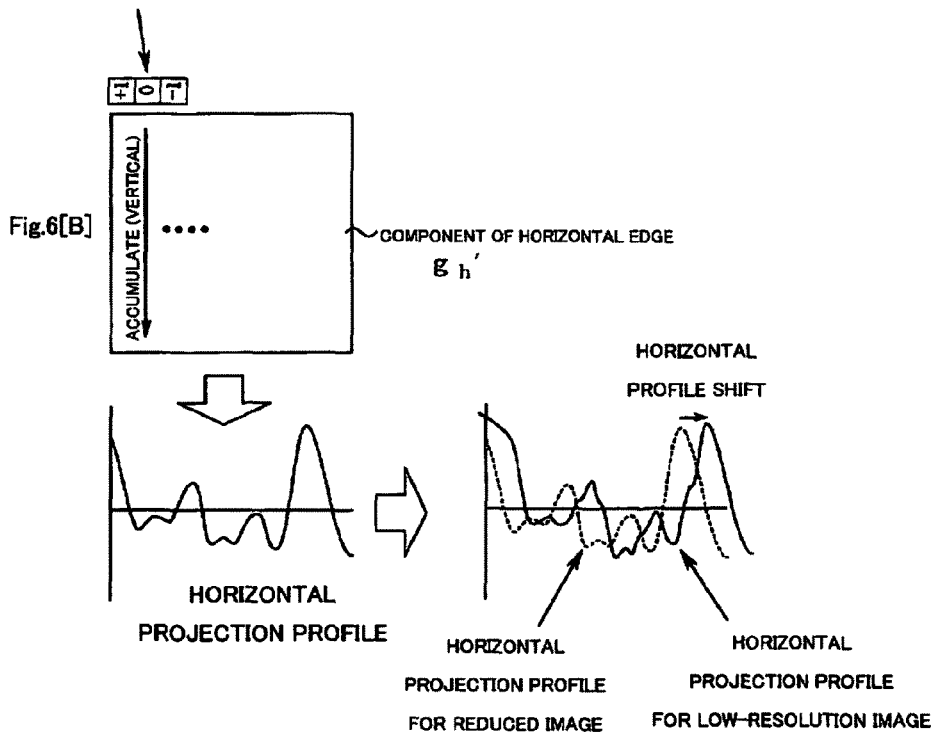
Fig.6[B]

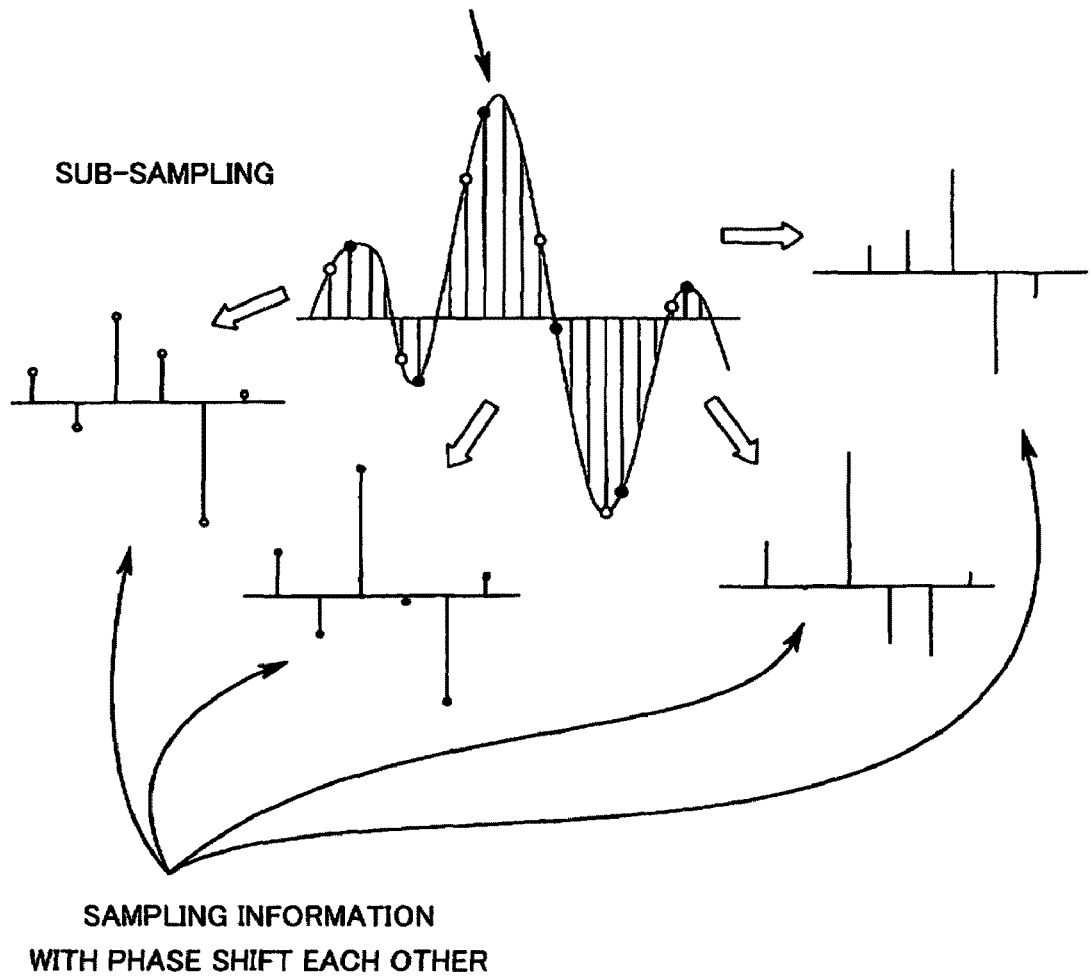

Fig.10
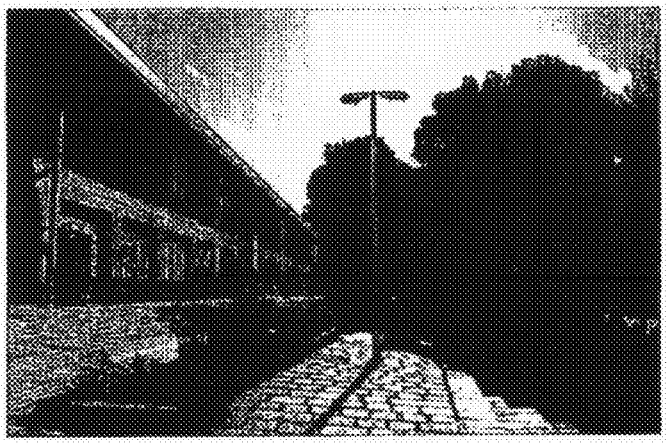
HIGH-RESOLUTION IMAGE
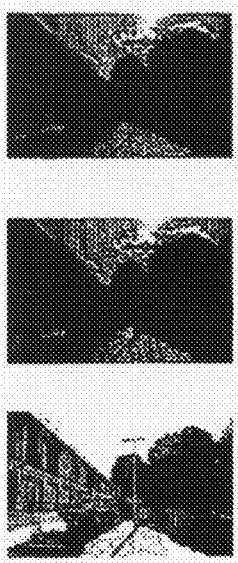
LOW-RESOLUTION IMAGE
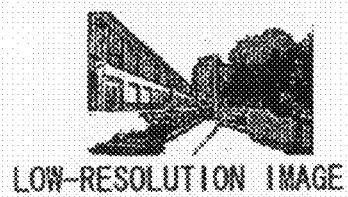
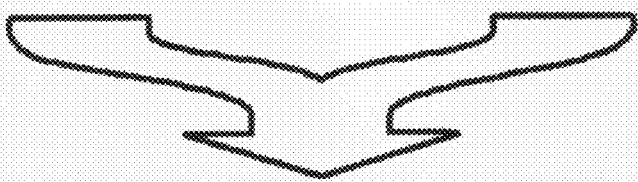
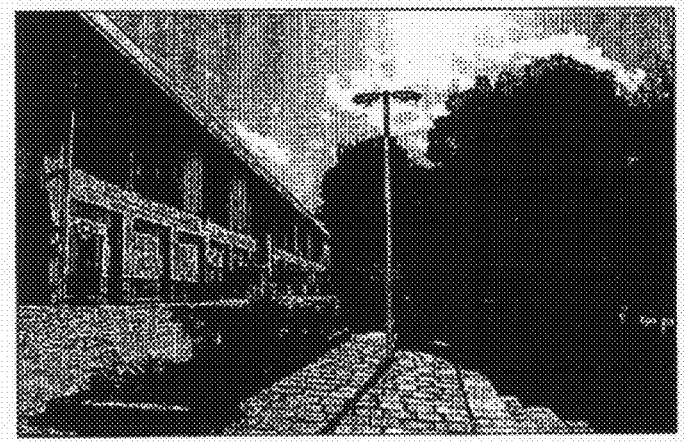
SYNTHESIZED IMAGE Fig. 13(a) CORRECT
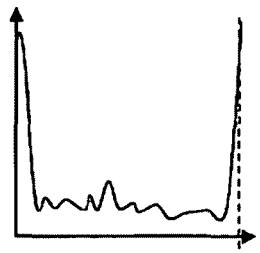
Fig. 13(b) 1-LEVEL
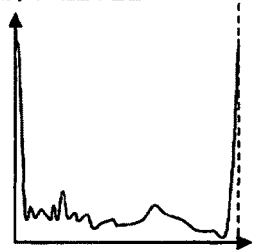
Fig. 13(c) 1-LEVEL UNDEREXPOSED(GAIN CORRECTION)
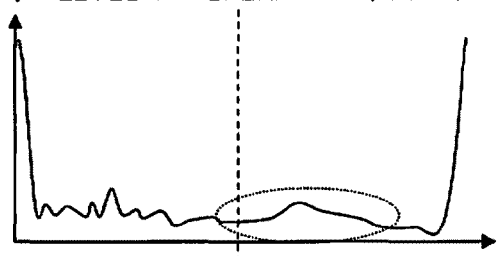
Fig. 13(d) 2-LEVEL
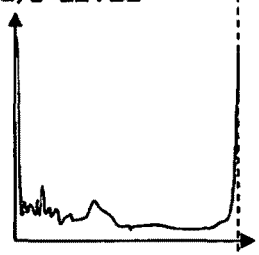
Fig. 13(e) 2-LEVEL UNDEREXPOSED(GAIN
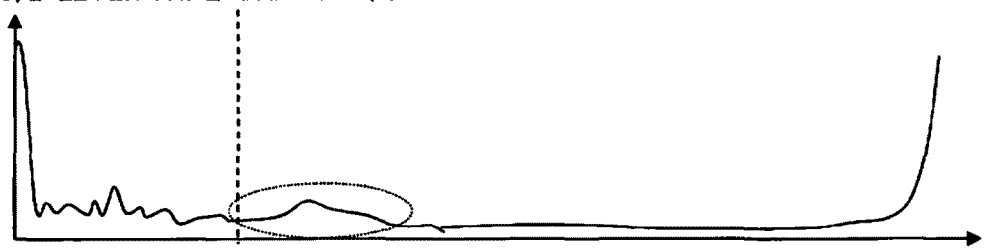

Fig. 18(a) HIGH-RESOLUTION IMAGE
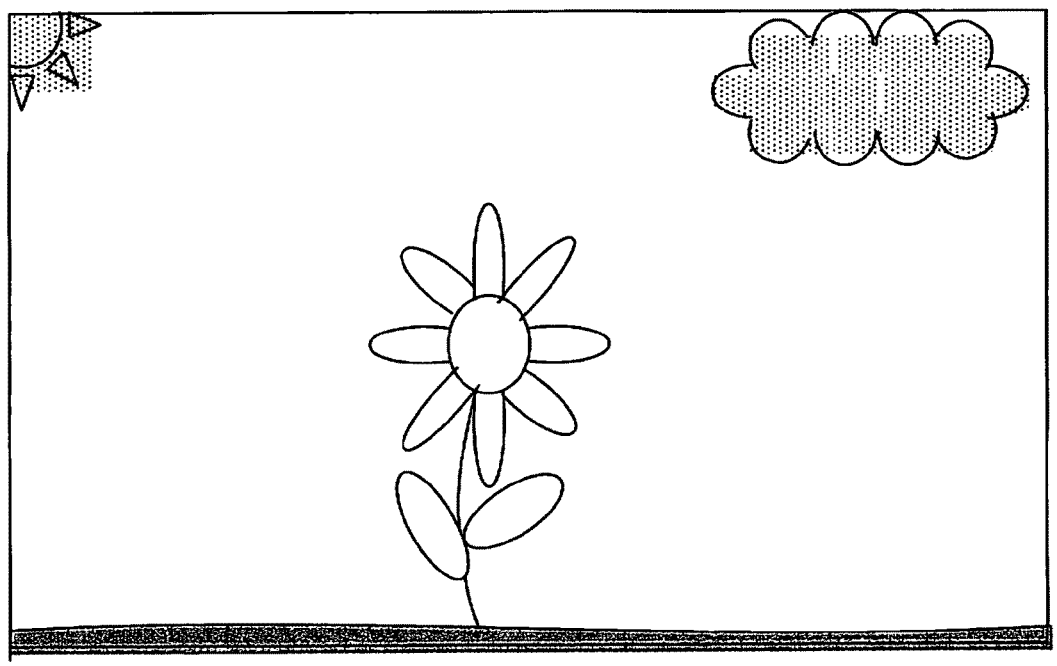
Fig. 18(b) THROUGH IMAGE
(1-LEVEL UNDER EXPOSED)
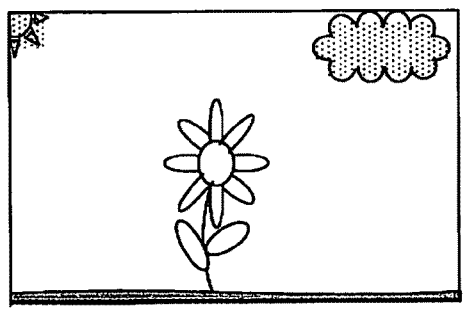
Fig. 18(c) THROUGH IMAGE
(2-LEVEL UNDER EXPOSED)
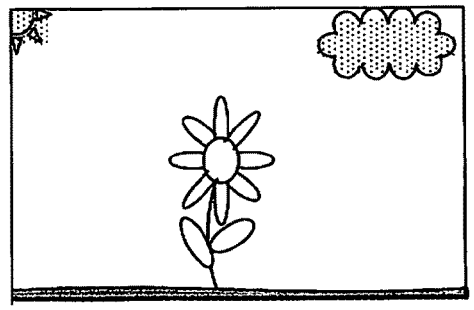

IMAGE PROCESSING DEVICE, ELECTRONIC CAMERA, IMAGE PROCESSING METHOD, AND IMAGE PROCESSING PROGRAM

CROSS-REFERENCE TO RELATED APPLICATION

This application is a U.S. National Stage application claiming the benefit of prior filed International Application Number PCT/JP2008/000037, filed Jan. 17, 2008, in which the International Application claims priorities from Japanese Application Numbers 2007-012516 (filed on Jan. 23, 2007), 2007-135300 (filed on May 22, 2007), and 2007-175972 (filed on Jul. 4, 2007), the entire contents of which are incorporated herein by reference.

TECHNICAL FIELD

The present application relates to an image processing device, an electronic camera, an image processing method, and an image processing program.

BACKGROUND ART

Conventionally, there is known a technique to generate a synthesized image in an expanded dynamic range by shooting the same subject while changing exposure settings and synthesizing a plurality of obtained images (for example, Patent Document 1).

As a technique to detect a positional shift of pictorial pattern between images output from different imaging devices with different resolutions, the following Patent Document 2 is well known. In this prior art, first wide-area search is performed between a high-resolution image and a low-resolution image to find a candidate for a matching region. Next, in the range of the matching region, both images are subjected to pixel interpolation and a region in which the pictorial pattern matches to the detail is found by the comparison between interpolated pixels.

Patent Document 1: Japanese Unexamined Patent Application Publication No. 2002-305684
Patent Document 2: International Publication WO95/04329 Pamphlet

DISCLOSURE

Problems to be Solved

With the prior art in Patent Document 1, however, it is necessary to read a still image with high resolution a plurality of times. In general, it takes a long time to read an image with high resolution, and therefore, the times when these images are shot are separated considerably from each other. As a result, if a subject or a camera moves, the degree of matching of pictorial pattern between a plurality of images is degraded and it becomes difficult to obtain an excellent effect for expanding gradation.

On the other hand, on the side of an electronic camera, it is required to fix the camera to pin a camera angle from moving during the period which a plurality of still images are shot, and therefore, it is difficult to perform shooting with expanding gradation with ease.

With the technique disclosed in Patent Document 1, data of a plurality of images with different exposure conditions described above is recorded in a storage medium in accordance with a choosing operation by a user and then a personal computer reads the image data from the storage medium to perform synthesizing processing.

As a result, with the technique disclosed in Patent Document 1, it is necessary for a user to instruct processing to save data of a plurality of images to be synthesized by performing a choosing operation with consciousness at the time of shooting in order to perform high precision image processing using a personal computer after shooting. Further, when performing image processing using a personal computer, it is necessary to specify image data to be synthesized and subject it to synthesizing processing.

Such a choosing instruction is advantageous to users with a high-level knowledge about image processing in that the degree of freedom about image processing can be improved, however, it is rather a complicated burden to general users.

The present application is developed with the above-mentioned problems being taken into consideration and a proposition thereof is to provide a technique to lessen the workload of a user while maintaining the technique to easily obtain a synthesized image in an expanded dynamic range and the degree of freedom about image processing.

Means for Solving the Problems

According to an aspect of the embodiments, an image processing device includes an image inputting part, a shift detecting part, and a gradation expanding part as a basic configuration.

The image inputting part takes in at least one of a plurality of low-resolution images and a high-resolution image obtained by shooting the same subject while changing exposure condition.

The shift detecting part detects a positional shift of pictorial pattern between each of the plurality of low-resolution images and the high-resolution image.

The gradation expanding part performs position alignment between each of the plurality of low-resolution images and the high-resolution image based on the positional shift. The gradation expanding part generates a synthesized image in which a range of reproduced gradation is expanded by extracting gradation information of the plurality of low-resolution images, and synthesizing it with the high-resolution image.

Preferably, the image inputting part takes in two or more low-resolution images. The gradation expanding part synthesizes the gradation information of low-resolution represented by each of the plurality of low-resolution images with the high-resolution image in a multiplexing manner.

Preferably, the shift detecting part includes a phase dividing part and a precisely detecting part.

The phase dividing part extracts an edge component of pictorial pattern from the high-resolution image. The phase dividing part generates a plurality of pieces of sampling information with sample positions shifted from one another by performing sub-sampling of the edge component while shifting phases.

The precisely detecting part detects a positional shift with a finer precision than a pixel interval of the low-resolution images by detecting the positional shift with which the pictorial pattern best matches between each of the plurality of low-resolution images and the plurality of pieces of sampling information.

Preferably, the gradation expanding part determines a high-brightness region and a low-brightness region of the high-resolution image. The gradation expanding part increases a synthesis ratio of one or more low-resolution images underexposed as to the high-brightness region of the high-resolution image. In addition, the gradation expanding part increases a synthesis ratio of one or more low-resolution images overexposed as to the low-brightness region of the high-resolution image.

More preferably, it may configure the gradation expanding part included in the above-described first image processing device so as to include an adjusting unit and a controlling unit to be described below.

The adjusting unit adjusts a tone level of a corresponding pixel of a synthesized image by reflecting a tone level of each pixel included in at least one of the low-resolution images chosen from the plurality of low-resolution images and a tone level of corresponding pixel of the high-resolution image. The controlling unit controls adjusting processing of the tone level of each pixel of the synthesized image by the adjusting unit based on at least one of the followings, a histogram of the tone level obtained for each of the plurality of low-resolution images, a histogram of the tone level obtained for the high-resolution image, and the number of the low-resolution images acquired by the image inputting unit.

Preferably, in the controlling unit, an analyzing unit analyzes a distribution of pixels in a predetermined range of tone levels as to the histogram of the tone level obtained for each of the plurality of low-resolution images and the histogram of the tone level of the high-resolution image. A converting curve fitting unit adjusts a gradation converting curve used to confine the tone level of each pixel of the synthesized image within a predetermined range in the adjusting unit based on the analysis result of the analyzing unit.

Further preferably, the analyzing unit analyzes a distribution of pixels in a predetermined range of tone levels as to the histogram of the tone level obtained for each of the plurality of low-resolution images and the histogram of the tone level of the high-resolution image in the controlling unit. A choosing unit chooses at least one of the low-resolution images to be used in adjusting processing by the adjusting unit based on the analysis result by the analyzing unit.

Further preferably, a range determining unit determines the size of a region of low-resolution images to be reflected in the adjustment of the tone level of each pixel included in the synthesized image by the adjusting unit in accordance with the number of low-resolution images to be used in synthesizing processing by the adjusting unit in the controlling unit.

Further preferably, a brightness weight determining unit determines a brightness weight to be applied when reflecting a brightness component, which corresponds to the pixel of at least one of the low-resolution images chosen, to a brightness component of each pixel included in the synthesized image by the adjusting unit in the controlling unit. A color-difference weight determining unit determines a color-difference weight to be applied when reflecting a color-difference component, which corresponds to the pixel of at least one of the low-resolution images chosen, to a color-difference component of each pixel included in the synthesized image by the adjusting unit. In the color-difference weight determining unit, the weight adjusting unit adjusts a value of the color-difference weight in accordance with the magnitude of a brightness component corresponding to each pixel of the high-resolution image.

An electronic camera disclosed below includes the basic components of the image processing device described above and an imaging part that shoots a subject with at least two kinds of resolution. In this case, the high-resolution image processed by the image processing device is a still image of the high-resolution shot by the imaging part. The image processing device processes at least one of the plurality of the low-resolution images shot by the imaging part before and/or after the shooting of the still image with the exposure condition different from the high-resolution image.

Preferably, there provides a monitor part that displays an image. The imaging part sequentially shoots low-resolution through images, through images are images obtained by pixel skipping to provide moving images for view finder, and displays a moving image on the monitor part. Further, the imaging part shoots the plurality of low-resolution images with timing not synchronizing the shooting of the through images and under the exposure condition different from the high-resolution image.

According to another aspect of the embodiment, the image processing device is configured to include a determining unit determines whether or not to attach one or more pieces of other image data as auxiliary information when performing image processing to an image data based on the image data capturing an image of a subject shot by an imaging unit and a predetermined condition, and a recording unit puts together a main image data, which is the image data to be processed in the image processing, and the auxiliary information into one image file and records in a recording medium in accordance with the determination result of attaching the auxiliary information.

Preferably, the configuration is such that the above-described determining unit includes a saturation detecting unit notifying the recording unit of the determination result to attach the auxiliary information when detecting a region in which a tone level of pixel included in the main image data is saturated.

Preferably, the configuration is such that the recording unit includes a first choosing unit that chooses other image data, obtained by shooting the same subject as the main image data at minimal time intervals, as the auxiliary information and used in process of attaching to the main image data.

Preferably, the configuration is such that the recording unit includes a second choosing unit that chooses other image data, obtained by shooting the same subject as the main image data at minimal time intervals under a different shooting condition, as the auxiliary information and used in process of attaching to the main image data.

Preferably, the configuration is such that the recording unit includes a third choosing unit that chooses image data in which a distribution range of a tone level of pixel represented in a histogram has a predetermined relationship with a peak position in a histogram of the main image data among other images, obtained by shooting the same subject as the main image data at minimal time intervals under a different shooting condition, as the auxiliary information and used in process of attaching to the main image data.

Preferably, the configuration is such that the recording unit includes a header creating unit that creates header information including the auxiliary information and attaches it to the main image data.

Further preferably, the configuration is such that the above-described header creating unit includes an extracting unit that extracts part of other image data used in image processing of the main image data in accordance with the purpose of the image processing and providing the part of other image data extracted in header information creating processing as auxiliary information.

According to an aspect of the embodiments, an image processing method configures as follows.

In an image inputting step, a plurality of low-resolution images obtained by shooting the same subject under a plurality of shooting conditions with an imaging unit that shoots images of the subject with a plurality of different resolutions and a high-resolution image obtained by shooting the subject under a correct exposure condition with the imaging unit are acquired. In a synthesizing step, at least one of the low-resolution images chosen from the plurality of low-resolution images and the high-resolution image are synthesized to generate a synthesized image having a resolution equivalent to the high-resolution image. In this synthesizing step, a tone level of a corresponding pixel of the synthesized image is adjusted by reflecting a tone level of each pixel included in at least one of the low-resolution images chosen and a tone level of corresponding pixel of the high-resolution image in an adjusting step. In a controlling step, the adjusting processing of the tone level of each pixel of the synthesized image in the adjusting step is controlled based on at least one of the followings, a histogram of a tone level obtained for each of the plurality of low-resolution images, a histogram of a tone level obtained for the high-resolution image, and the number of the low-resolution images acquired in the image inputting step.

According to another aspect of the embodiments, the image processing method below, main image data and auxiliary information used in image processing are read from an image file including the main image data, which to be processed in an image processing, recorded in a computer-readable recording medium and the image processing for the main image data is performed using the read auxiliary information.

The above-described image processing device can also be realized by causing a computer to function as the above-described image processing device with an image processing program.

BRIEF DESCRIPTION OF THE DRAWINGS

FIG. 6 are a diagram that explains a detecting procedure of a positional shift.

FIG. 7 is a diagram that explains sub-sampling of a high-resolution image.

FIG. 10 is a diagram that explains an effect for expanding gradation.

FIG. 13 are a diagram that explains distribution analyzing processing based on a histogram.

FIG. 18 are a diagram illustrating a relationship of correspondence between a high-resolution image and a through image.

DETAILED DESCRIPTION OF THE EMBODIMENTS

Hereinafter, embodiments of the present application will be explained in detail based on the drawings.

Embodiment 1

[Explanation of Electronic Camera Configuration]

Figure 1:
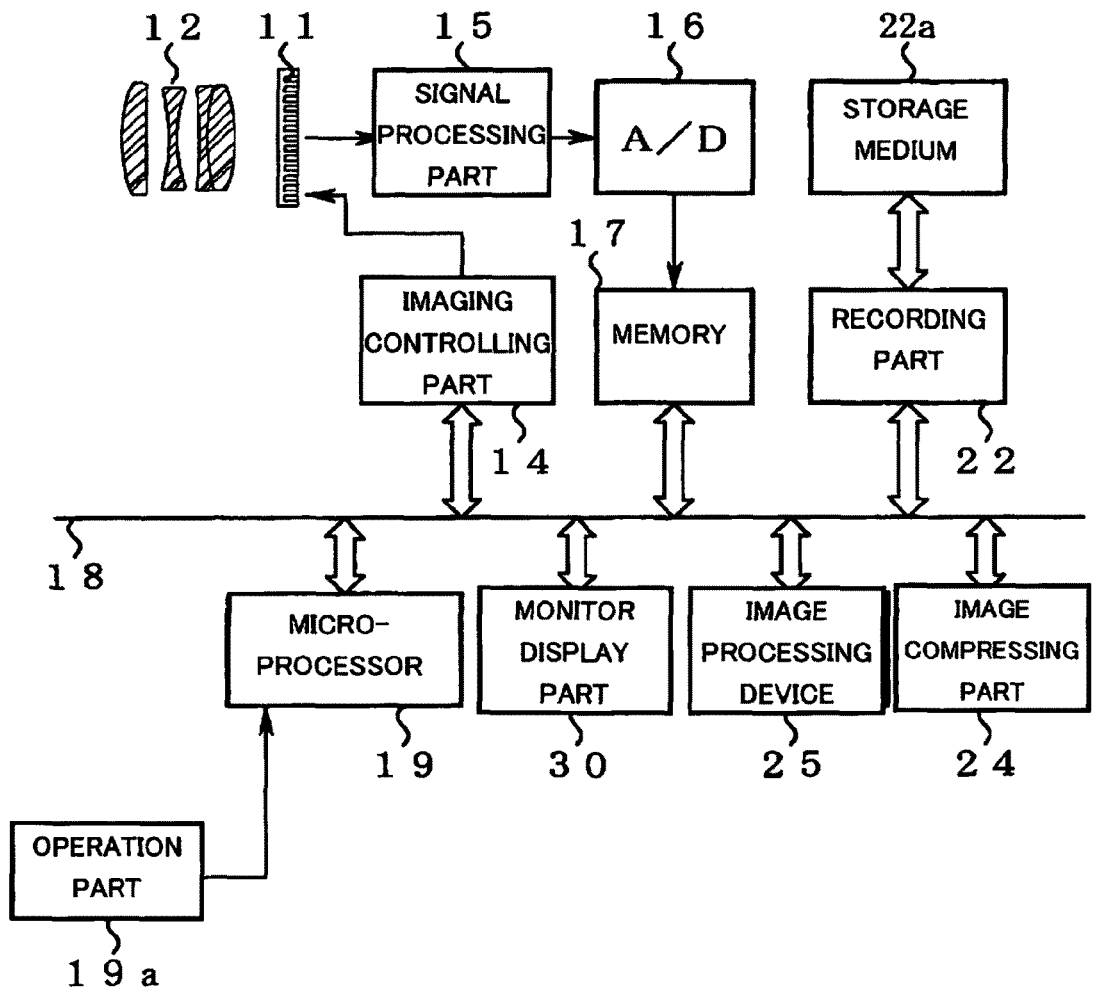
FIG. 1 is a block diagram illustrating an electronic camera 10 (including an image processing device 25) in the present embodiment.

FIG. 1 is a block diagram illustrating an electronic camera 10 (including an image processing device 25) in the present embodiment.

In FIG. 1, a shooting lens 12 is mounted on the electronic camera 10. In an image space of the shooting lens 12, an imaging surface of an imaging device 11 is arranged. The imaging device 11 includes a mode in which a high-resolution image is read and a mode in which a low-resolution image is read by performing pixel skipping and pixel data accumulation within the device. These reading modes are controlled by an imaging controlling part 14. An image signal generated by the imaging device 11 is stored temporarily in a memory 17 after being processed via a signal processing part 15 and an A/D converting part 16.

The memory 17 is coupled to a bus 18. To the bus 18, the imaging controlling part 14, a microprocessor 19, a recording part 22, an image compressing part 24, a monitor display part 30, the image processing device 25, etc., are also coupled. To the above-mentioned microprocessor 19, an operation part 19a, such as a release button, is coupled. Further, to the above-mentioned recording part 22, a storage medium 22a is mounted detachably.

[Explanation of Image Processing Device 25]

Figure 2:
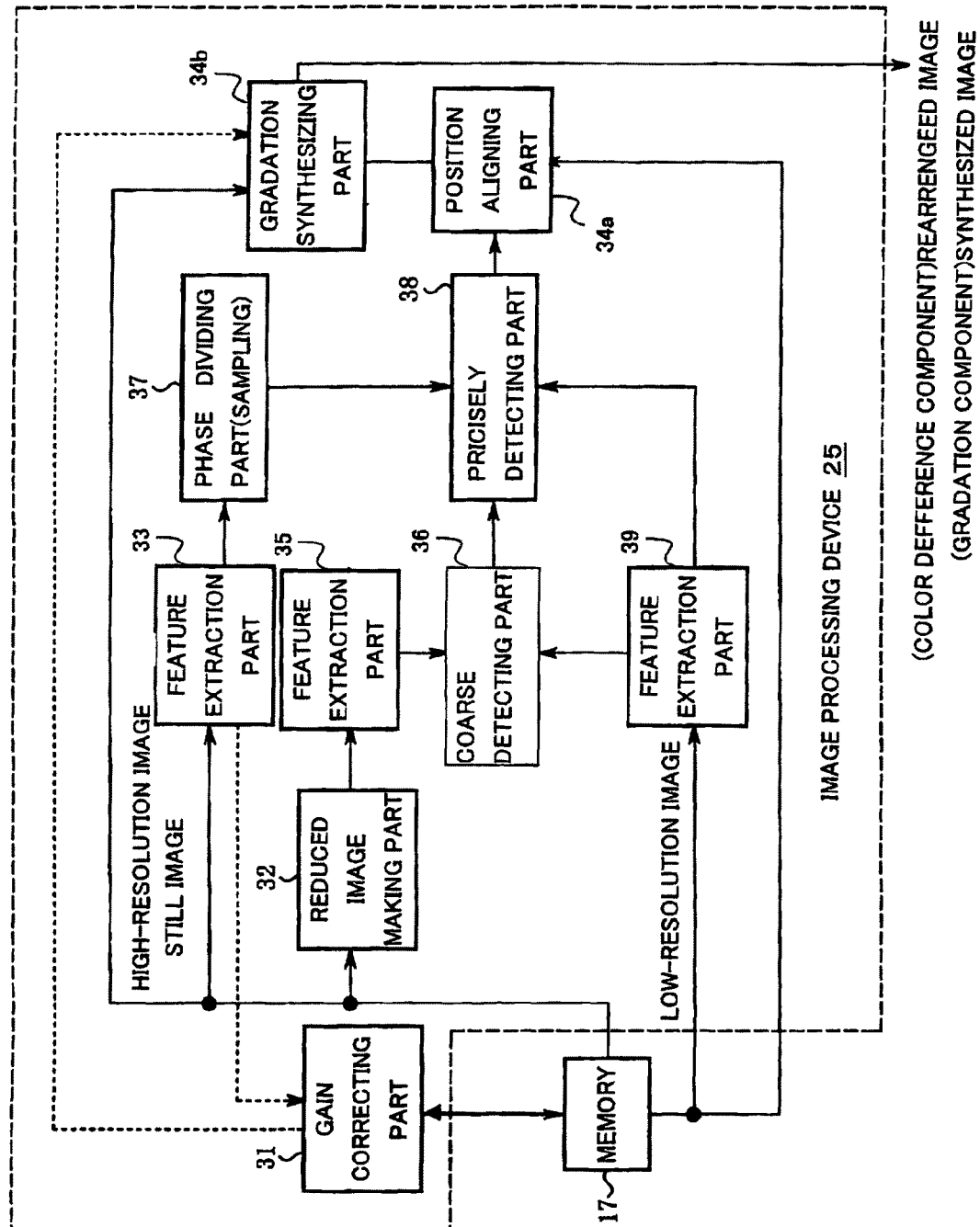
FIG. 2 is a block diagram schematically illustrating a configuration of the image processing device 25.

FIG. 2 is a block diagram schematically illustrating a configuration of the image processing device 25.

A gain correcting part 31 performs gain correction and gradation correction for an image in the memory 17. A high-resolution image read from the memory 17 is transferred to a reduced image making part 32, a feature extraction part 33, and a gradation synthesizing part 34b, respectively. The output data of the reduced image making part 32 is transferred to a coarse detecting part 36 via a feature extraction part 35. The output data of the feature extraction part 33 is transferred to a precisely detecting part 38 via a phase dividing part 37. Information about an edge is transferred from the feature extraction part 33 to the gain correcting part 31.

On the other hand, a plurality of low-resolution images read from the memory 17 is transferred to a feature extraction part 39 and a position aligning part 34a, respectively. The output data of the feature extraction part 39 is transferred to the coarse detecting part 36 and the precisely detecting part 38, respectively.

A positional shift coarsely detected by the coarse detecting part 36 is transferred to the precisely detecting part 38. A positional shift precisely detected by the precisely detecting part 38 is transferred to the position aligning part 34a. The position aligning part 34a adjusts the position of pixel of a low-resolution image based on the positional shift and outputs it to the gradation synthesizing part 34b. The gradation synthesizing part 34b acquires information about the amount of gain correction from the gain correcting part 31 and synthesizes a plurality of low-resolution images with a high-resolution image based on the acquired information.

The gradation expanding part according to claims corresponds to the position aligning part 34a and the gradation synthesizing part 34b.

[Explanation of Operation]

Figure 3:
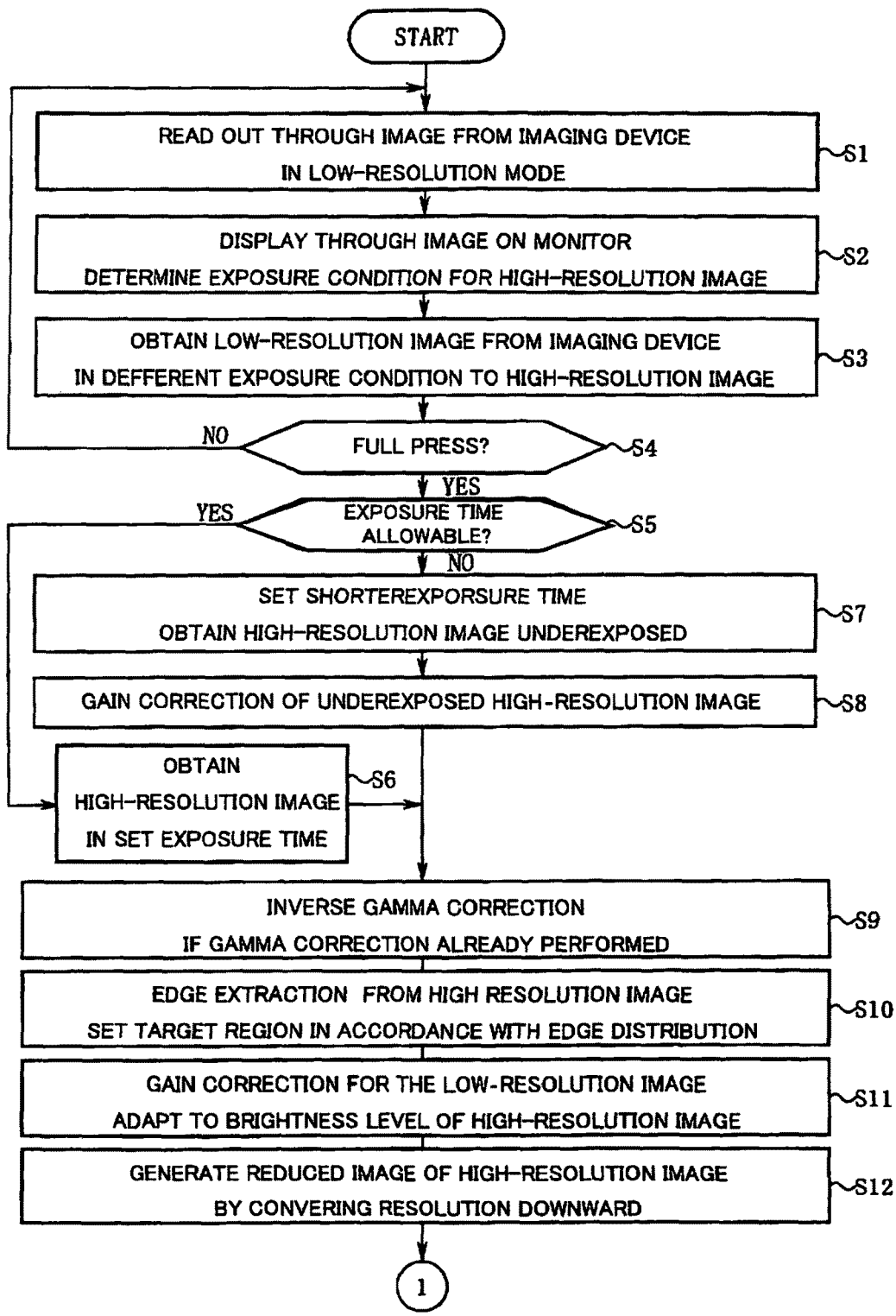
FIG. 3 is a flow chart (1/2) that explains the operation of the electronic camera 10.
Figure 4:
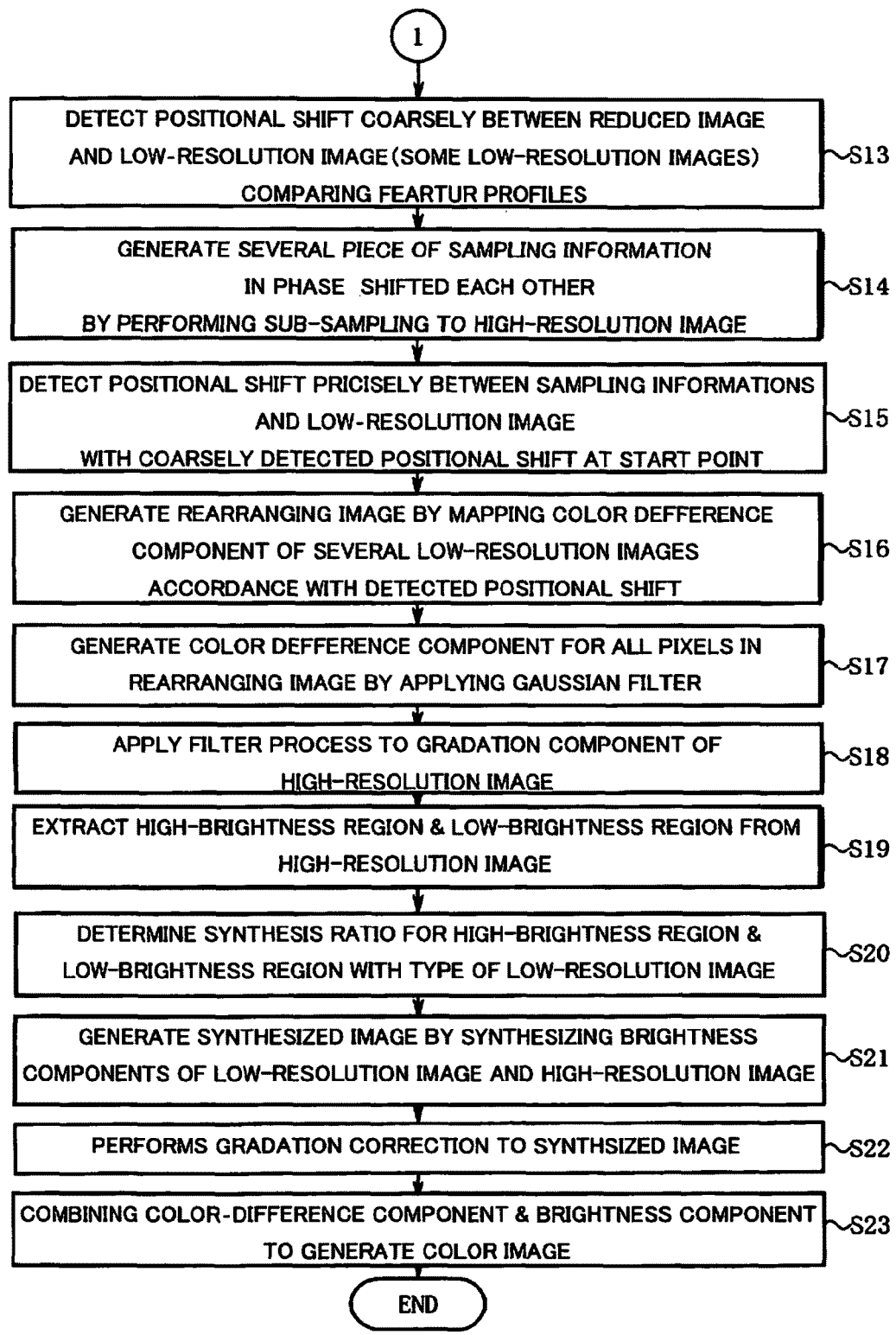
FIG. 4 is a flow chart (2/2) that explains the operation of the electronic camera 10.

FIG. 3 and FIG. 4 are flow charts that explain the operation of the electronic camera 10. Hereinafter, the operation is explained along step numbers represented in these drawings.

Figure 5:
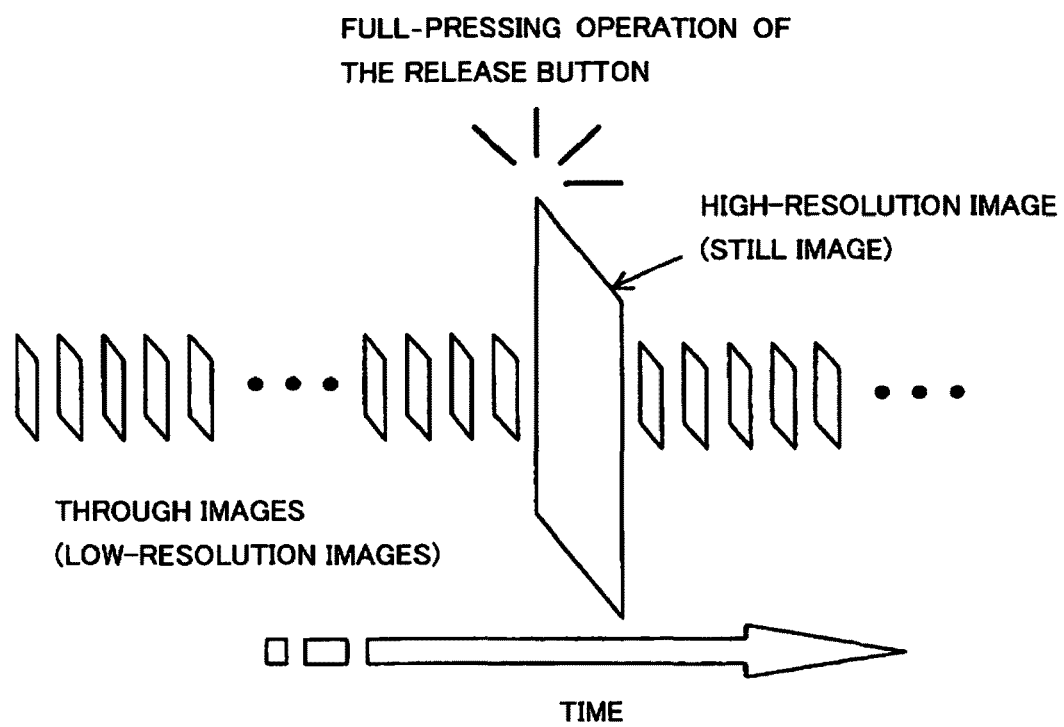
FIG. 5 is a flow chart that explains a shooting sequence of the electronic camera 10.

Step S1: When the main power source of the electronic camera 10 is turned on, the microprocessor 19 instructs the imaging controlling part 14 to read a through image. The imaging controlling part 14 drives the imaging device 11 in a low-resolution reading mode and sequentially reads through images at, for example, 30 frames per second, as represented in FIG. 5.

Step S2: The through image read from the imaging device 11 is processed via the signal processing part 15 and the A/D converting part 16. Among the through images, those in which the tone shift by an exposure adjustment, to be described later, is small are displayed in a moving image on the monitor display part 30. It is possible for a user to determine a picture composition of shooting with the electronic camera 10 by viewing the display of the moving image of through images.

On the other hand, the microprocessor 19 performs exposure calculation based on the result of photometry by a photometer part (not represented) and the brightness of the through image and determines an exposure condition of a high-resolution image.

Step S3: The imaging controlling part 14 drives the imaging device 11 in a low-resolution reading mode during the period of shooting of through images. As a result, one or more through images (low-resolution images) are generated as represented in FIG. 5.

At this time, the imaging controlling part 14 adjusts the exposure condition of the low-resolution image so that the range of reproduced gradation is different from that of the high-resolution image. For example, compared to the exposure time of the high-resolution image, the exposure time of the low-resolution image is varied to two-level underexposed, one level underexposed, one level overexposed, and two-level overexposed. The low-resolution images thus generated are stored temporarily in the memory 17.

When the number of recorded low-resolution images exceeds a predetermined upper limit number, the imaging controlling part 14 deletes the low-resolution images from older one. It is preferable to determine in advance the upper limit number in accordance with the available storage capacity of the memory 17 etc.

Step S4: Here, the microprocessor 19 determines whether or not the full-pressing operation of a release button is performed by a user.

When the full-pressing operation of the release button is performed, the microprocessor 19 moves the operation to step S5.

On the other hand, when the full-pressing operation of the release button is not performed, the microprocessor 19 returns the operation to step S1.

Step S5: Here, the microprocessor 19 determines whether or not the exposure time of the high-resolution image determined in step S2 is equal to or below an allowable upper limit which camera shake is not remarkable in image. For example, the allowable upper limit is set to about 1/(focal length of the shooting lens 12 converted into 35 mm size) seconds.

When the exposure time setting is less than or equal to the allowable upper limit, the microprocessor 19 moves the operation to step S6.

On the other hand, when the exposure time setting exceeds the allowable upper limit, the microprocessor 19 moves the operation to step S7.

Step S6: The imaging controlling part 14 performs shutter control for the imaging device 11 in accordance with the set exposure time. Subsequently, the imaging controlling part 14 drives the imaging device 11 in the high-resolution reading mode and reads the high-resolution image. The high-resolution image (still image) is stored temporarily in the memory 17 via the signal processing part 15 and the A/D converting part 16.

After this operation, the microprocessor 19 moves the operation to step S9.

Step S7: On the other hand, when it is determined that the exposure time setting exceeds the allowable upper limit against camera shake, the microprocessor 19 limits the exposure time equal to or below the allowable upper limit which camera shake is not remarkable in image.

The imaging controlling part 14 performs shutter control for the imaging device 11 in accordance with the exposure time limited to a shorter one. In this state, the imaging controlling part 14 drives the imaging device 11 in the high-resolution reading mode and reads the high-resolution image. The high-resolution image is an image the signal level of which is low because of underexposure, however, in which camera shake is less conspicuous. The high-resolution image is stored temporarily in the memory 17.

Step S8: The gain correcting part 31 performs gain correction of the underexposed high-resolution image.

Step S9: The gain correcting part 31 determines whether or not the high-resolution image and the low-resolution image in the memory 17 have already been subjected to gamma correction. For the image having already been subjected to gamma correction, the gain correcting part 31 performs inverse gamma correction (at this time, it is preferable to increase quantifying bit number for gradation component so that the gradation width of the image is not limited substantially).

This processing makes it possible to perform synthesizing processing of an image, to be described later, on a substantially linear gradation axis.

Step S10: The feature extraction part 33 takes in the high-resolution image and extracts a vertical edge component gv and a horizontal edge component gh using an edge extraction filter.

Here, it is preferable to switch the edge extraction filters as follows in accordance with the reading method of the low-resolution image.

When the low-resolution image is created by pixel data accumulation or pixel averaging $$gv(x,y)=[-f(x,y-4)-f(x,y-3)-f(x,y-2)-f(x,y-1)+f(x,y+4)+f(x,y+5)+f(x,y+6)+f(x,y+7)]/4$$

$$gh(x,y)=[-f(x-4,y)-f(x-3,y)-f(x-2,y)-f(x-1,y)+f(x+4,y)+f(x+5,y)+f(x+6,y)+f(x+7,y)]/4$$

When the low-resolution image is created by pixel skipping $$gv(x,y)=-f(x,y-4)+f(x,y+4)$$

$$gh(x,y)=-f(x-4,y)+f(x+4,y)$$

In order to reduce the influence of noise, it is preferable for the feature extraction part 33 to replace the vertical edge component gv and the horizontal edge component gh that fall within a predetermined reduced amplitude with zero.

The feature extraction part 33 chooses a region in which the number of edge components is large in the image based on the edge components gv, gh and determines the region as a target region.

Step S11: The brightness level of the low-resolution image is different from the brightness level of the high-resolution image because of the difference in the exposure condition. Therefore, the gain correcting part 31 performs gain correction for the low-resolution image in the memory 17 to adapt the brightness level to that of the high-resolution image.

For example, for the low-resolution image that has been subjected to n-stage exposure correction, its brightness level can be adapted to that of the high-resolution image by multiplying the linear brightness level by a factor of $1/(2^n)$.

It may also be possible to perform the gain correction of the low-resolution image so that the brightness level of the low-resolution image matches with that of the high-resolution image in the target region obtained in step S10.

Step S12: The reduced image making part 32 adapts the number of pixels of the high-resolution image to that of the low-resolution image by converting the resolution of the high-resolution image after gain adjustment.

For example, it is possible to convert resolution so that the numbers of vertical and horizontal pixels of the high-resolution image are reduced to ¼, respectively, by extracting an average value of 4×4 pixels for the corresponding pixel of the reduced image.

The image the resolution of which is reduced as described above (hereinafter, referred to as a reduced image) is transferred to the feature extraction part 35.

Step S13: Subsequently, the coarse detecting part 36 detects a positional shift between the reduced image and the low-resolution image.

FIG. 6 are a diagram illustrating a procedure for finding a positional shift by comparing edge projections. Hereinafter, processing to detect a positional shift at a high speed is explained using FIG. 6.

First, the feature extraction part 35 extracts a vertical edge component gv' from a reduced image f(x, y) using a vertical edge extraction filter represented in the following expression (refer to FIG. 6[A]).

$$gv'(x,y)=-f(x,y-1)+f(x,y+1)$$

Further, the feature extraction part 35 extracts a horizontal edge component gh' from the reduced image f(x, y) using a horizontal edge extraction filter represented in the following expression (refer to FIG. 6[B]).

$$gh'(x,y)=-f(x-1,y)+f(x+1,y)$$

In order to reduce the influence of noise, it is preferable for the feature extraction part 35 to replace the vertical edge component gv' and the horizontal edge component gh' that fall within a small enough predetermined amplitude with zero.

Next, the feature extraction part 35 calculates a vertical projection profile by accumulating the vertical edge component gv' in units of horizontal rows as represented in FIG. 6[A].

Further, the feature extraction part 35 calculates a horizontal projection profile by accumulating the horizontal edge component gh' in units of vertical columns as represented in FIG. 6[B].

On the other hand, the feature extraction part 39 takes in a plurality of low-resolution images from the memory 17. The feature extraction part 39 performs the same processing as the feature extraction part 35 to the individual low-resolution images to find a vertical projection profile and a horizontal projection profile, respectively.

Here, the coarse detecting part 36 finds a difference by shifting the vertical projection profile in the center region of the reduced image and the vertical projection profile in the center region of the low-resolution image as represented in FIG. 6[A] and detects a profile shift with which the sum of the absolute differences is the minimum. This profile shift corresponds to the positional shift between the reduced image and the low-resolution image in the vertical direction.

Further, the coarse detecting part 36 finds a difference by shifting the horizontal projection profile in the center region of the reduced image and the horizontal projection profile in the center region of the low-resolution image as represented in FIG. 6[B] and detects a profile shift with which the sum of the absolute differences is the minimum. This profile shift corresponds to the positional shift between the reduced image and the low-resolution image in the horizontal direction.

In this manner, the coarse detecting part 36 finds the positional shifts (coarse detection result) of the plurality of low-resolution images with the reduced image as a positional reference, respectively, and outputs them to the precisely detecting part 38.

Step S14: Next, the positional shift between the high-resolution image and the low-resolution image is detected precisely.

First, the feature extraction part 33 calculates a vertical projection profile of the high-resolution image by accumulating the vertical edge component gv obtained in step S10 in units of horizontal rows. Further, the feature extraction part 33 also calculates a horizontal projection profile of the high-resolution image by accumulating the horizontal edge component gh obtained in step S10 in units of vertical columns.

The phase dividing part 37 performs sub-sampling of the vertical projection profile of the high-resolution image for every four pixels. At this time, the phase dividing part 37 generates four kinds of sampling information the phases of which are shifted from each other as represented in FIG. 7 by shifting the phase of sub-sampling.

Similarly, the phase dividing part 37 performs sub-sampling of the horizontal projection profile of the high-resolution image for every four pixels. At this time, the phase dividing part 37 generates four kinds of sampling information the phases of which are shifted from each other by shifting the phase of sub-sampling.

Step S15: The precisely detecting part 38, starting from the positional shift which is the result of the coarse detection process performed by the coarse detecting part 36, detects a profile shift with which the sum of absolute differences is the minimum by finding a difference while shifting the sampling information of the vertical projection profile obtained from the high-resolution image and the vertical projection profile of the low-resolution image.

The precisely detecting part 38 finds a profile shift with which the characteristics of pictorial pattern (here, profile) best match by performing the detection of the profile shift for the four kinds of sampling information, respectively. This profile shift corresponds to the positional shift in the horizontal direction. Further, the precisely detecting part 38 detects a positional shift in the vertical direction in a similar manner.

As described above, the precisely detecting part 38 finds the positional shifts (precise detection result) of the plurality of low-resolution images with the high-resolution image as the positional reference with a precision finer than the pixel interval of the low-resolution image and outputs them to the position aligning part 34a.

Step S16: The position aligning part 34a expands the low-resolution image (magnification of 4×4). At this time, the position aligning part 34a obtains an expanded image with expanded pixel interval without performing pixel interpolation.

Figure 8:
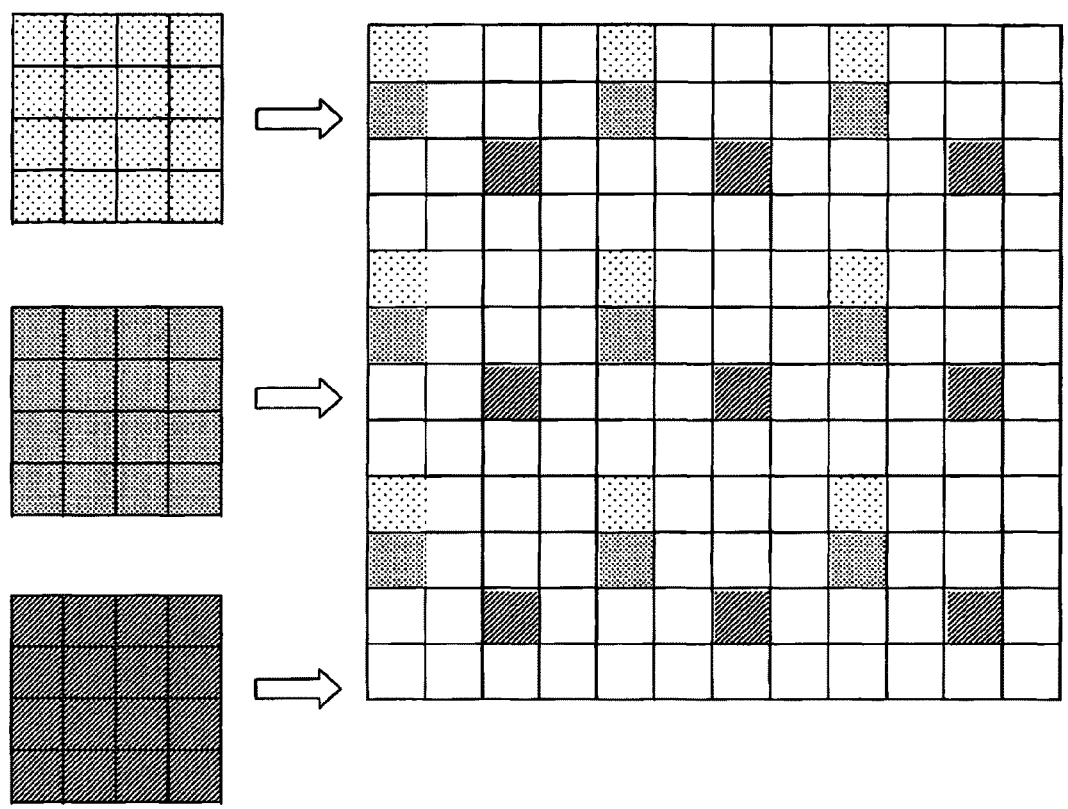
FIG. 8 is a diagram that explains the generation of a rearranged image.

Next, the position aligning part 34a performs mapping (rearrangement) as represented in FIG. 8 by respectively displacing the pixel positions of the expanded image of the low-resolution image based on the precise detection result of the positional shift obtained by the precisely detecting part 38. In this manner, it is possible to obtain a rearranged image having substantially the same numbers of vertical and horizontal pixels as those of the high-resolution image.

Step S17: In the rearranged image for which the mapping processing is completed, there remains pixels unmapped, pixels shifted from the normal pixel position, and overlapped pixels.

Therefore, the position aligning part 34a picks up a nearby pixel for each normal pixel position of the rearranged image. The position aligning part 34a applies Gaussian filter in the following expression to the color-difference component of these nearby pixels.

$$g(i, j) = \frac{\left[\sum_{k=1}^{m}\sum_{l=1}^{m}\left\{G(k, l)f\begin{pmatrix}i-(m-1)/2+k-1,\\j-(m-1)/2+l-1\end{pmatrix}\right\}\right]}{\left\{\sum_{k=1}^{m}\sum_{l=1}^{m}G(k, l)\right\}}$$

$$G(i, j) = \exp\left[-\frac{i^2 + j^2}{2\sigma^2}\right]$$

The f(x, y) is the color-difference component of a pixel position (x, y) of the rearranged image. Here, m is a range of the nearby pixels and σ is a numerical value to adjust a weighted ratio. For example, as specific numerical values, it is preferable that m=5 and σ=3.

The position aligning part 34a determines the color-difference component of the rearranged image by regarding the calculation result of the Gaussian filter as the color-difference component of the normal pixel position.

Step S18: The gradation synthesizing part 34b performs the next filter processing for the brightness component of the high-resolution image. First, the gradation synthesizing part 34b extracts the brightness component from the high-resolution image after having been subjected to gain correction and performs filter processing that combines median processing and the Gaussian filter. For example, the gradation synthesizing part 34b sets the filter size to 3×3 pixels, extracts three medians from the nine pixels in this filter size, and then performs the Gaussian filter. Due to this processing, it is possible to reduce the amount of noise produced in the brightness component resulting from underexposure etc.

Step S19: The gradation synthesizing part 34b extracts an image region having a high possibility of being saturated gradation as map information from the high-resolution image. For example, the gradation synthesizing part 34b extracts an image region the brightness level of which reaches the saturation level of the imaging device 11 as a high-brightness region. In addition, for example, the gradation synthesizing part 34b extracts an image region the brightness level of which does not exceed the range of saturated black of the imaging device 11 as a low-brightness region.

Step S20: The gradation synthesizing part 34b obtains information about the amount of gain correction of the low-resolution image performed in step S11 from the gain correcting part 31. According to the amount of gain correction, the gradation synthesizing part 34b determines the synthesis ratio between the high-resolution image and the low-resolution image as follows.

(1) Low-brightness region of high-resolution image . . . . The synthesis ratio of the low-resolution image applying the amount of gain correction which is less than 1 is set as high as about, for example, 30 to 50%. On the other hand, as to the low-resolution image the amount of gain correction of which is more than 1, the synthesis ratio is set as low as about 0%. Due to this setting, it is possible to reflect the gradation information represented by dark part of the low-resolution image having been subjected to overexposure correction in the high-resolution image.

(2) High-brightness region of high-resolution image . . . . The synthesis ratio of the low-resolution image the amount of gain correction of which is more than 1 is set as high as about, for example, 30 to 50%. On the other hand, as to the low-resolution image the amount of gain correction of which is less than 1, the synthesis ratio is set as low as about 0%. Due to this setting, it is possible to reflect the gradation information represented by bright part of the low-resolution image having been subjected to underexposure correction in the high-resolution image.

(3) Edge of high-resolution image . . . . A portion (edge) is extracted, where the brightness component locally changes so as to exceed a predetermined ratio. The synthesis ratio of the low-resolution image for this edge is reduced as low as about 0%. Due to this setting, it is possible to maintain the edge structure of the high-resolution image.

Step S21: The position aligning part 34a corrects the positional shift of the low-resolution image in accordance with the precise detection result of the positional shift detected in step S15. The gradation synthesizing part 34b extracts the brightness component from the low-resolution image after having been subjected to positional shift correction and performs weighted addition to the brightness component of the high-resolution image in accordance with the synthesis ratio determined in step S20. Due to this weighted addition, the range of reproduced gradation of the synthesized image is expanded substantially in the linear manner.

Figure 9:
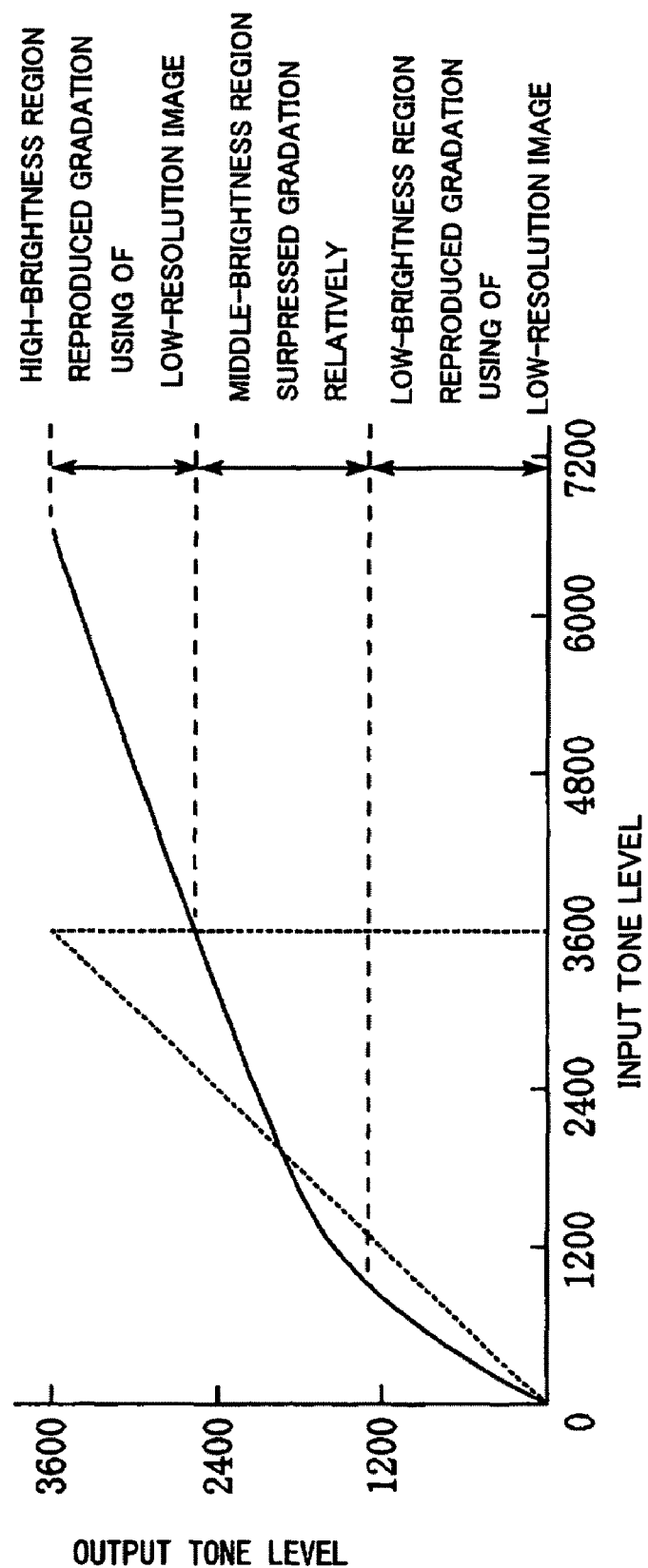
FIG. 9 is a diagram that explains gradation conversion of a synthesized image.

Step S22: The gradation synthesizing part 34b performs gradation correction of the brightness component of the synthesized image using the gradation converting characteristics as represented in FIG. 9. With the gradation converting characteristics, the gradation range of medium- to high-brightness is subjected to gradation compression, and thereby, the gradation information restored the high-brightness region is confined within a range of practical signal values. Further, as to the range of low-brightness gradations, gradation extension is performed to an extent at which saturated black is suppressed and dark part noise does not increase, and thereby, the gradation information restored in the low-brightness region is confined within a range of practical signal values.

Step S23: By combining the color-difference component (rearranged image) generated in step S17 and the brightness component (synthesized image) generated in step S22, a color image in which the range of reproduced gradation is expanded is completed. This color image is recorded and stored in the recording medium 22a via the image compressing part 24, the recording part 22, etc.

[Effects and Others of the Embodiment]

In the present embodiment, a low-resolution image generated in the low-resolution reading mode is utilized for expanding the gradation of a still image (high-resolution image). The low-resolution image is read at a high rate of, for example, 30 to 60 frames per second. As a result, when synthesizing the high-resolution image and the low-resolution image, collapse resulting from the difference in pictorial pattern is unlikely to occur, and therefore, it is possible to obtain an excellent effect for expanding gradation.

Further, in the present embodiment, a plurality of low-resolution images is generated while correcting exposure in the positive and negative directions. Consequently, it is made possible to obtain gradation information in various gradation regions. As a result, it is possible to obtain an excellent effect for expanding gradation in the high-brightness and low-brightness gradation regions.

Further, even if a plurality of low-resolution images is shot as described above, it is possible to continuously shoot at a high frame rate, and therefore, shooting is completed in an instant. Consequently, the period of time during which a user has to fix a camera angle is shortened considerably than before. As a result, it is possible for a user to perform shooting with expanding gradation with ease.

Further, in the present embodiment, a plurality of pieces of sampling information in accordance with the sampling phases which are shifted from one another is generated from the high-resolution image. By detecting a positional shift between the sampling information and the low-resolution image, it is possible to detect a positional shift with a precision finer than the pixel interval of the low-resolution image. As a result, it is made possible to further improve the position aligning precision of pictorial pattern between the high-resolution image and the low-resolution image, and therefore, it is possible to obtain a more excellent effect for expanding gradation.

Further, in the present embodiment, as to the region where spots of saturated gradations are few, the synthesis ratio of the low-resolution image is reduced adaptively. Consequently, it is also made possible to keep the original gradation information of the high-resolution image faithfully.

Further, in the present embodiment, at the edge of the high-resolution image, the synthesis ratio of the low-resolution image is reduced locally. Consequently, it is possible to avoid troubles, such as that edge is turned into multiple lines after synthesis.

Complementary Items of Embodiment

The inventors of the present application have disclosed the procedure to further increase the speed of the positional shift detection in Japanese Patent Application No. 2005-345715. It may also be possible to increase the speed of the positional shift detection in the present embodiment according to the procedure.

In step S13, the absolute positional shift between the reduced image of the high-resolution image and the low-resolution image is detected coarsely. However, the present application is not limited to this. It may also be possible to coarsely detect the relative positional shift between a plurality of low-resolution images. It is possible for the precisely detecting part 38 to roughly estimate the remaining absolute positional shift based on the relatively coarse detection result and the precise detection result of at least one positional shift. It is made possible for the precisely detecting part 38 to quickly detect the precise positional shift by searching for a positional shift with the absolute coarse detection result as its start point.

In the above-described embodiment, the positional shift of an image is detected from the comparison between projection profiles. However, the present application is not limited to this. For example, it may also be possible to detect the positional shift by the spatial comparison between pixel arrangements of both images.

In the above-described embodiment, the case is explained where the image processing device 25 is mounted on the electronic camera 10. However, the present application is not limited to this. It may also be possible to create an image processing program into which the above-described image processing is encoded. It is made possible to effectively utilize gradation information of a low-resolution image to expand the gradation of a high-resolution image by causing a computer to execute the image processing program.

In the above-described embodiment, the low-resolution image is obtained before the shooting of the high-resolution image. However, the present application is not limited to this. For example, it may also be possible to obtain the low-resolution image after the shooting of the high-resolution image. Further, it may also be possible to obtain a plurality of low-resolution images over the period of time before and after the shooting of the high-resolution image.

In the above-described embodiment, the gradation information of the low-resolution image is provided for both the high-brightness region and the low-brightness region. However, the present application is not limited to this. The gradation information of the low-resolution image may be provided for one of the high-brightness region and the low-brightness region. For example, it is possible to expand the range of reproduced gradation in the high-brightness region by providing the gradation information of the low-resolution image having been subjected to the negatively-exposed correction for the high-brightness region of the high-resolution image. In addition, it is possible to expand the range of reproduced gradation in the low-brightness region by providing the gradation information of the low-resolution image having been subjected to the positively-exposed correction for the low-brightness region of the high-resolution image.

In the above-described embodiment, the case is explained where the image signal of the brightness color-difference is dealt with. However, the present application is not limited to this. In general, it may also be possible to apply the present application to a case where RGB, Lab, or other image signals are dealt with.

In the above-described embodiment, the positional shift of pictorial pattern is detected by image processing. However, the present application is not limited to this. For example, it may also be possible to obtain movement (oscillation) of the shooting region of the camera by mounting an acceleration sensor etc. on the camera side and detect the positional shift of pictorial pattern of a plurality of images from the movement (oscillation) of the shooting region.

In the above-described embodiment, only the low-resolution images the exposure conditions of which have been changed are synthesized with the high-resolution image. However, the present application is not limited to this. For example, it may also be possible to include a low-resolution image the exposure condition of which is the same as that of the high-resolution image in synthesis. The low-resolution image with the same exposure condition has an effect to, for example, improve S/N of a synthesized image.

As described above, the image processing device disclosed in the section of MEANS FOR SOLVING PROBLEM, a low-resolution image and a high-resolution image having different exposure conditions are synthesized and thereby the range of reproduced gradation is expanded. In this case, as to the low-resolution image, the number of pixels is small, and therefore, the read time during the period of shooting can be shortened. Consequently, it is possible to increase the degree of matching of pictorial pattern between images by shortening the interval between the shooting time of the high-resolution image and the low-resolution image. As a result, the pictorial patterns match well with each other when synthesizing an image, and therefore, it is possible to obtain an excellent effect for expanding gradation.

With the electronic camera disclosed also in the section of means for solving problem, a high-resolution image and a low-resolution image are shot under different exposure conditions. In this case, the read time of the low-resolution image is short, and therefore, it is possible to complete the shooting of the low-resolution image in a brief time. As a result, the period during which a user has to fix the camera angle is shortened and easier shooting with expanding gradation is enabled.

Embodiment 2

Figure 11:
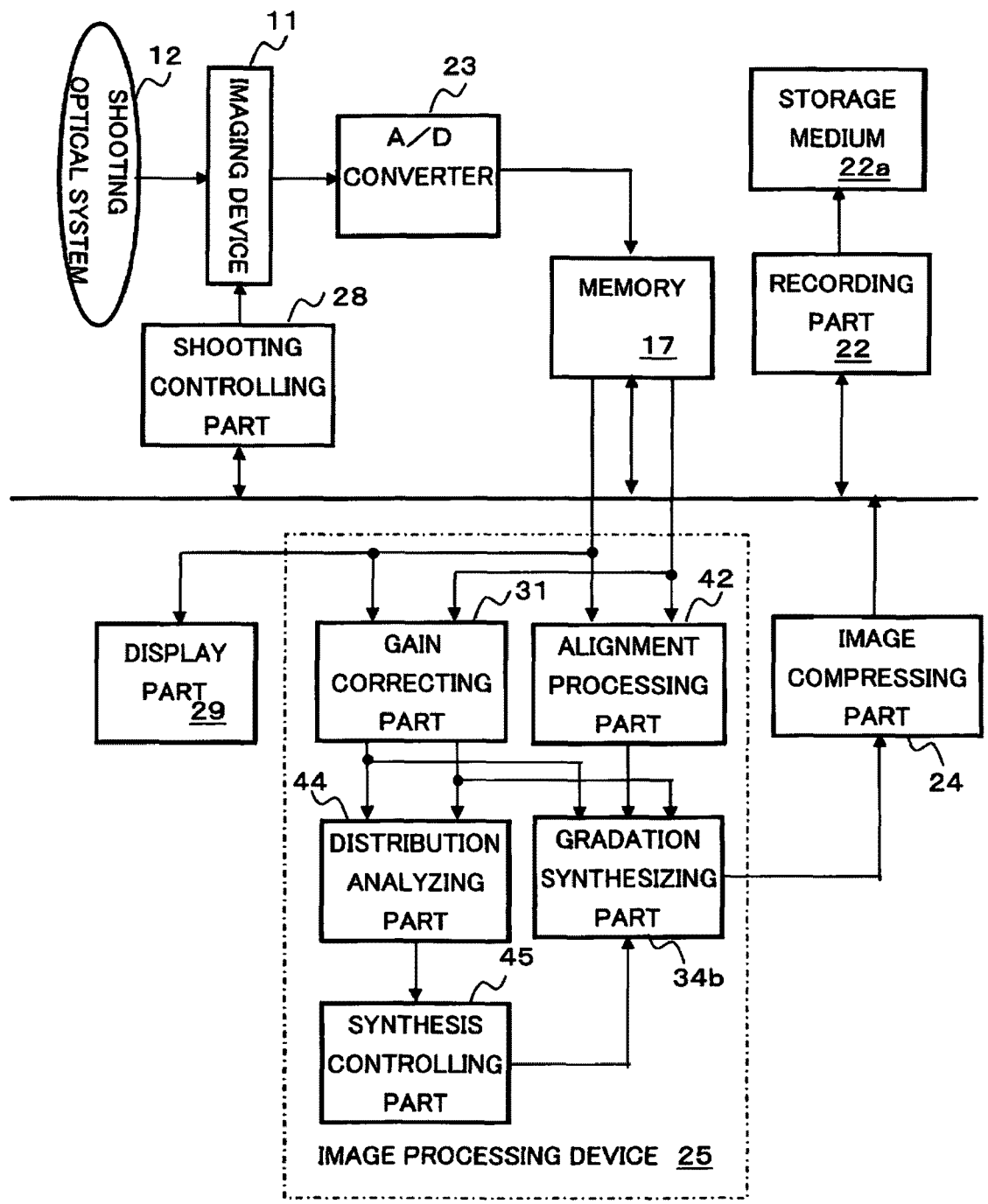
FIG. 11 is a diagram illustrating another embodiment of an image processing device according to the present application.

FIG. 11 represents a second embodiment of an image processing device according to the present application.

Among components represented in FIG. 11, those equivalent to the components represented in FIG. 1 or FIG. 2 are representing the same symbols assigned and their explanation is omitted.

In a digital camera represented in FIG. 11, light formed into a optical image on the imaging device 11 by the shooting optical system 12 when shooting an image is converted into an electric signal according to its intensity by the imaging device 11, and is further converted into digital data by an analog/digital (A/D) converter 23 and stored in the memory 17. The memory 17 represented in FIG. 11 is coupled with the image processing device 25, the image compressing part 24, the recording part 22, and a shooting controlling part 28 via a bus and the shooting controlling part 28 switches the reading mode of the imaging device 11.

The shooting controlling part 28 represented in FIG. 11 instructs the high resolution mode to the above-described imaging device 11 to read data corresponding to all of the pixels in response to the operation of the release button by a user and the high-resolution image data obtained from the electric signal read by the imaging device 11 in response to this is stored in the memory 17 and, at the same time, subjected to the processing of the image processing device 25. On the other hand, before and after the release button is operated, the shooting controlling part 28 switches the reading mode of the imaging device 11 to the through image mode and in response to this, the low-resolution image data obtained by pixel skipping and pixel data accumulation within the imaging device 11 is subjected to display processing by a display part 29 via the memory 17 and thus the user is provided with information about the shooting range.

During the period of time in which the above-described through image mode is applied, the low-resolution image data obtained from the output signal of the imaging device 11 obtained under various exposure conditions is stored in the memory 17 and subjected to the processing of the image processing device 25 along with the above-described high-resolution image data. The image data having been subjected to the processing of the image processing device 25 is transferred to the recording part 22 via a bus after being compressed by the image compressing part 24 and recorded in the recording medium 22a.

In the image processing device 25 represented in FIG. 11, a position alignment processing part 42 extracts features from the high-resolution image and the plurality of low-resolution images received from the memory 17 and the positional shift between them is corrected based on the extracted features.

Further, the gain correcting part 31 represented in FIG. 11 performs gain correction in accordance with the difference in the exposure condition between the high-resolution image and the individual low-resolution images and the low-resolution image after the correction is synthesized with the high-resolution image based on the processing result of the above-described position alignment processing part 42 by the gradation synthesizing part 34b, and subjected to the processing of the image compressing part 24.

The above-described position alignment processing part 42 is configured by each part that provides functions relating to the correction processing of positional shift in the image processing device 25 represented in FIG. 2.

In the image processing device 25 represented in FIG. 11, a distribution analyzing part 44 creates histograms of tone level, respectively, for the high-resolution image and the low-resolution image corrected by the gain correcting part 31, and analyzes the histograms and subjects the analysis result to the processing of a synthesis controlling part 45.

The synthesis controlling part 45 represented in FIG. 11 determines various parameters to be applied to the gradation synthesizing processing in the gradation synthesizing part 34b based on the analysis result of the distribution analyzing part 44 and subjects these parameters to the processing of the gradation synthesizing part 34b, and thus controlling the processing of the gradation synthesizing part 34b.

Hereinafter, the detailed operations of the distribution analyzing part 44 and the synthesis controlling part 45 are explained by taking a case as an example, where the high-resolution image with correct exposure obtained by the present shooting and the through images (low-resolution images) obtained with one level underexposed and two levels underexposed are synthesized to generate a high-resolution image with an expanded dynamic range in which the range of reproduced gradation is expanded.

Figure 12:
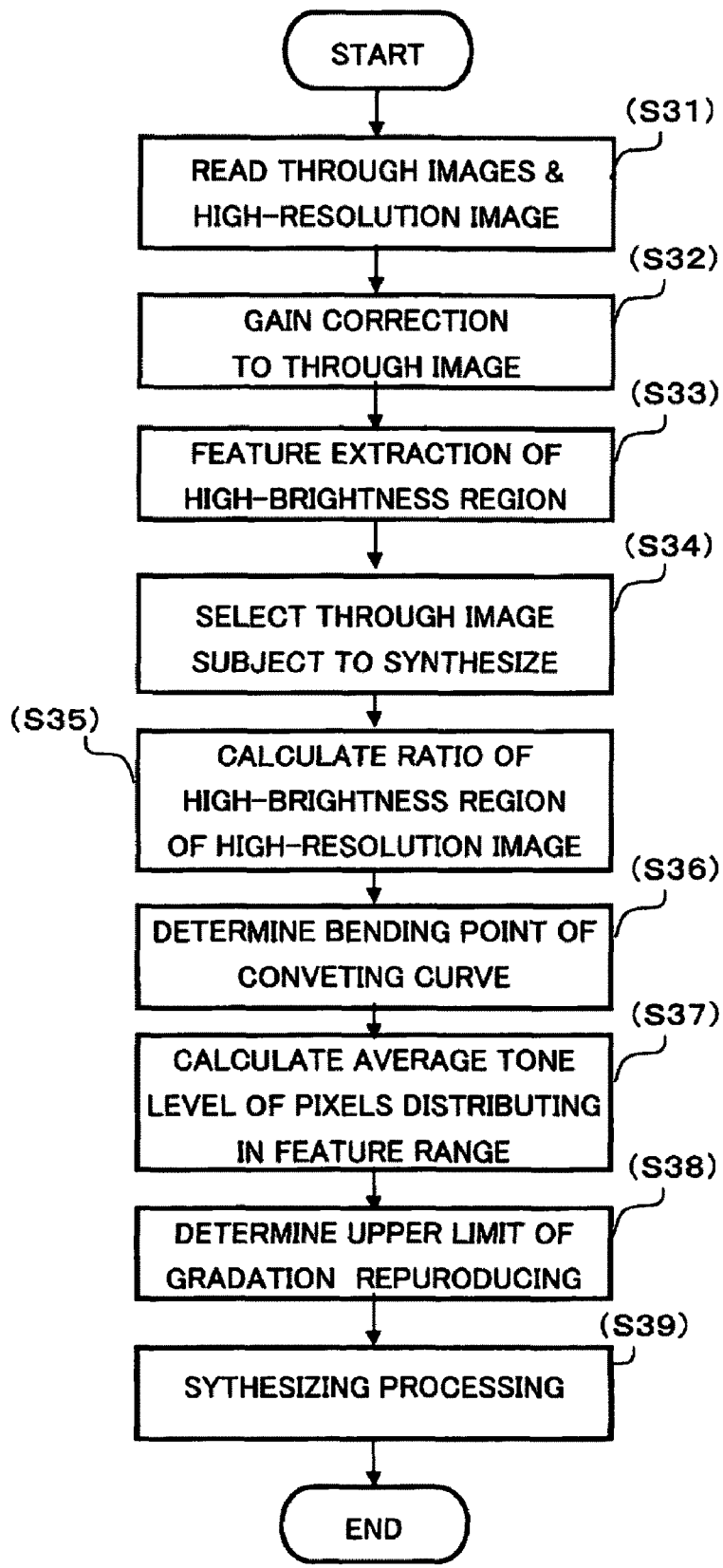
FIG. 12 is a flow chart representing image synthesizing processing.

FIG. 12 is a flow chart representing image synthesizing processing. FIG. 13 represent a diagram that explains distribution analyzing processing.

From among the through images stored in the memory 17, a through image applied with an exposure value lower than that of the exposure condition applied to the present shooting is extracted and read by the image processing device 25 along with the high-resolution image obtained by the present shooting (step S31). In the memory 17, through images obtained under various exposure conditions are stored for the exposure value determining processing prior to the present shooting and from among these through images, for example, a through image obtained with one level underexposed and a through image obtained with two levels underexposed with respect to the correct exposure applied to the present shooting are read from the memory 17 and subjected to subsequent processing.

For the through images read in this manner, the tone value of each pixel included in the through image is multiplied by a constant in accordance with the ratio between the exposure value applied to each of the through images and the correct exposure by the gain correcting part 31, and thus gain correction is performed (step S32). Here, if the read through image has already been subjected to gamma transformation, inverse gamma transformation is performed prior to gain correction. Consequently, the histogram of the through image obtained with one level underexposed (refer to FIG. 13(b)) and the histogram of the through image obtained with two levels underexposed (refer to FIG. 13(d)) are converted into histograms (refer to FIGS. 13(c), (e)) that can be compared with the histogram of the high-resolution image shot with correct exposure (refer to FIG. 13(a)) in terms of the distribution of pixels in a linear space.

For the histogram of the through image thus obtained, the distribution analyzing part 44 searches for a range where more than a predetermined threshold number of pixels are distributed in a high-brightness range, which is equivalent to saturated level when correct exposure is applied (The high-brightness range is more than or equal to the tone level indicated by the broken line in FIG. 13). The distribution analyzing part 44 extracts the range obtained by searching as a feature of the gradation in the high-brightness region (step S33).

In step S3, for example, when ranges indicated surrounded by the broken line in FIGS. 13(c), (e) are detected, the distribution analyzing part 44 notifies the synthesis controlling part 45 that the feature of the gradation in the high-brightness region is extracted and in response to this, the synthesis controlling part 45 chooses the through image from which the feature of the gradation has been extracted as a low-resolution image to be synthesized (step S34).

Figure 14A:
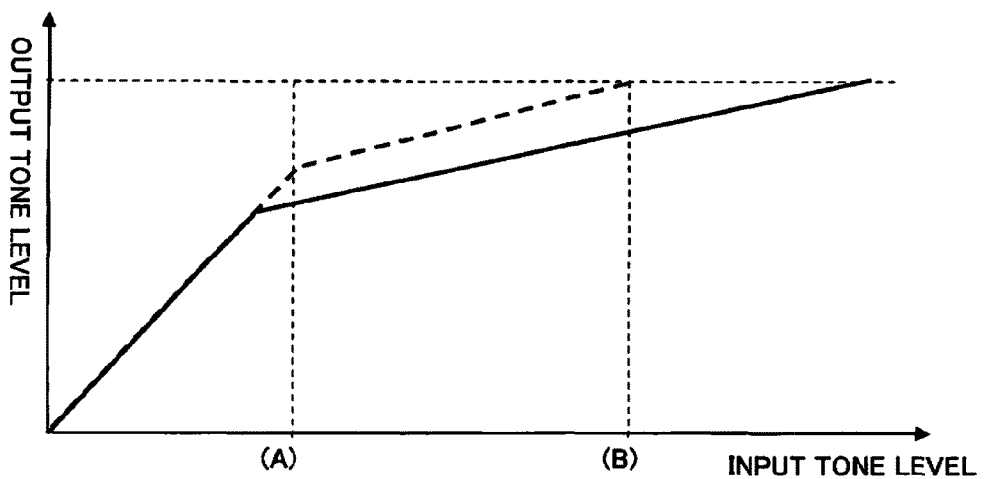
FIG. 14 are an explanatory diagram of a gradation converting curve.

When performing synthesizing processing, the distribution analyzing part 44 finds the total number of pixels in the high-brightness region having a tone level more than or equal to a predetermined threshold value of the high-resolution image read from the memory 17 and calculates the ratio between the number of pixels in the high-brightness region and the total number (step S35), and the synthesis controlling part 45 determines the position of a bending point (representing assigned symbol (A) in FIG. 14(a)) on a gradation converting curve for converting the tone level into an 8-bit tone level finally in accordance with the restrictions of the display device etc. (step S36).

At this time, for example, the distribution analyzing part 44 calculates the ratio of pixels having a tone level that is converted into a predetermined value (for example, a numerical value of 200) or more by conversion using a general gradation converting curve (represented by the thick line in FIG. 14) for converting a 12-bit tone level into an 8-bit tone level. When this ratio is larger than or equal to a predetermined threshold value, the synthesis controlling part 45 moves the position of the bending point toward the side of smaller input tone levels (left side in FIG. 14) in accordance with, for example, the difference between the above-described ratio and the threshold value. To the contrary, when the above-described ratio is smaller than the predetermined threshold value, the synthesis controlling part 45 moves the position of the bending point toward the side of larger input tone levels (right side in FIG. 14) in accordance with the difference between the above-described ratio and the threshold value.

For example, when a subject is shot in a picture composition in which brightly glittering cloud occupies a significant proportion in the image, the ratio of the high-brightness region obtained by the distribution analyzing part 44 in step S35 becomes large and in response to this, the position of the bending point on the gradation converting curve is moved nearer to the side of smaller input tone levels than the position represented by symbol (A) in FIG. 14.

Next, the distribution analyzing part 44 calculates an average value of tone levels of pixels distributing in the range in which the tone level is not saturated in the individual through images chosen as a target of synthesis in the above-described step S34 and exceeding the distribution range of the tone levels in the high-resolution image (step S37), and the synthesis processing part 35 determines the position of the upper limit of the range of reproduced gradation (representing assigned symbol (B) in FIG. 14(a)) by the above-described gradation converting curve based on the average value (step S38).

For example, for the through image obtained with one level underexposed and the through image obtained with two levels underexposed having the histograms represented in FIG. 13, the average value of tone levels of the pixels distributed in the ranges (refer to FIGS. 13(c), (e)) extracted respectively in the above-described step S33 is found, and further, in accordance with the average value, the upper limit of the range of reproduced gradation is moved nearer to the side of larger input tone levels than the position represented by symbol (B) in FIG. 14 (that is, upper limit of the 12-bit tone level). Here, when a plurality of through images with different exposure values is obtained, it is only required to determine the upper limit of the range of reproduced gradation in accordance with a value obtained by further averaging the average values found respectively for each of them. At this time, it is also possible for the synthesis controlling part 45 to move the upper limit of the range of reproduced gradation to the position at which, for example, the difference between the above-described average value and the upper limit of the 12-bit tone level, that is, the upper limit of the tone level of the high-resolution image, is added to the average value.

In this manner, a gradation converting curve is generated, with which the gradation in the high-brightness region can be reproduced by the 8-bit tone level by compressing the gradation in the region having a brightness less than or equal to an medium level and expanding the range in which the change of tone level in a high-brightness range is reproduced as the change of 8-bit tone level. The gradation converting curve is applied to the gradation converting processing of the synthesized image obtained by synthesizing the through image and the high-resolution image obtained in the synthesis processing part 35 (step S39).

In step S33, when a range is not extracted, in which a predetermined number or more of pixels are distributed in the above-described range in all of the through images, it may also be possible to determine that there is no feature of the gradation in the high-brightness region to be reflected in the high-resolution image and end the step without performing synthesizing processing.

Figure 14B:
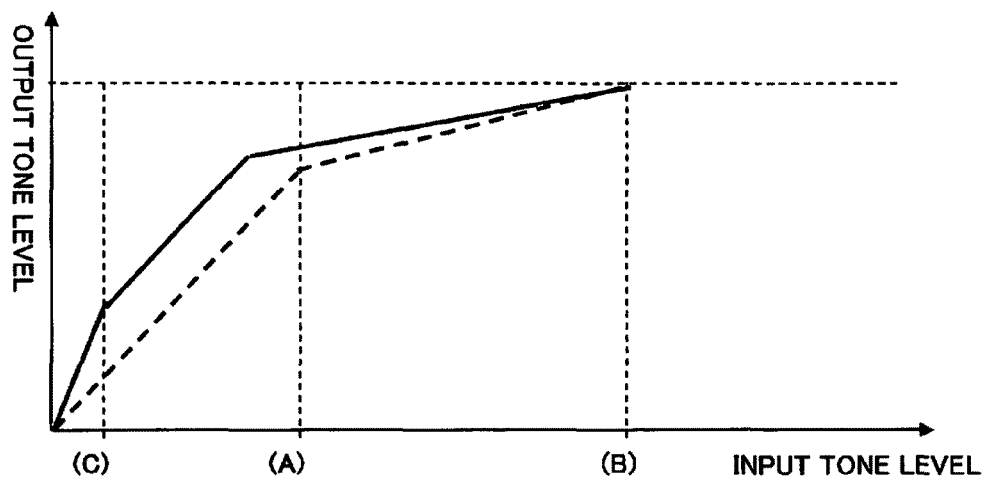

For the low-brightness region in the state of "saturated black" in the high-resolution image, it is also possible to make an attempt at expansion toward the direction of lower brightness in the range of reproduced gradation by applying a gradation converting curve having a plurality of bending points as represented in FIG. 14(b).

Next, synthesizing processing by the gradation synthesizing part 34b is explained.

The position alignment processing part 42 performs position alignment between the high-resolution image and each through image obtained and based on the result of aligning processing, the gradation synthesizing part 34b rearranges the brightness component and the color-difference component of each pixel included in the through image in a pixel space having the same density as that of the high-resolution image as represented in FIG. 8.

At this time, it is possible for the gradation synthesizing part 34b to obtain a brightness component $B'_y$ (i, j) of a rearranged image by rearranging the brightness component obtained by the above-described gain correcting part 31 performing gain correction for each through image using the exposure value of the high-resolution image as a reference value.

Next, when the high-resolution image has already been subjected to gamma transformation, the gradation synthesizing part 34b performs inverse gamma transformation on pixel data $A_y$ (i, j) of the high-resolution image to find pixel data in a linear space and then finds a brightness component $g'_y$ (i, j) of a synthesized image by performing weighted addition the brightness component $B'_y$ (i, j) of the rearranged image also in the linear space to a brightness component $A'_y$ (i, j) of the high-resolution image having been subjected to the linear transformation.

It is possible for the gradation synthesizing part 34b to perform weighted addition processing of a filter size m with the target pixel as its center represented in expression (2) by using, for example, a weighting function G (i, j, p). G (i, j, p) gives a heavy weight to the brightness component B'y (i, j) of the rearranged image having a value close to tone level p of the target pixel (i, j) of the high-resolution image. By this weighted addition processing, the brightness component $g'_y$ (i, j) in the linear space of the synthesized image can be found.

$$G'(i, j, p) = \exp\left(-\frac{(p - B_y(i, j))^2}{2\sigma^2}\right) \quad (1)$$

$$g'_y(i, j) = \frac{\left[\sum_{k=1}^{m}\sum_{l=1}^{m}\left\{\begin{array}{c}G'(k, l, A_y(i, j))\\B'_y(i-(m-1)/2+\\k-1, j-(m-1)/2+l-1)\end{array}\right\} + A'_y(i, j)\right]}{\sum_{k=1}^{m}\sum_{l=1}^{m}G'(k, l, A_y(i, j)) + 1} \quad (2)$$

On the other hand, the gradation synthesizing part 34b finds a color-difference component $A'_{CbCr}$ (i, j) of the high-resolution image and a color-difference component $B'_{CbCr}$ (i, j) of the rearranged image in a manner similar to the above based on the pixel level of the high-resolution image and the through image to be synthesized and finds a color-difference component $g'_{CbCr}$ (i, j) of the synthesized image by performing weighted addition of them.

At this time, in the high-brightness region in the "saturated white" state in the high-resolution image, the gradation synthesizing part 34b, taking into consideration that the color-difference component has small value, obtains component $g'_{CbCr}$ (i, j) by weighting the color-difference component $B'_{CbCr}$ (i, j) of the rearranged image based on the brightness component and adding it as represented in expression (4). Add obtained component $g'_{CbCr}$ (i, j) and the color-difference component $A'_{CbCr}$ (i, j) of the high-resolution image with a weight expressed by expression (3) (refer to expression (5)).

$$G'(n) = \exp\left(-\frac{n^2}{2\sigma^2}\right) \quad (3)$$

$$g'_{CbCr}(i, j) = \frac{\left[\sum_{k=1}^{m}\sum_{l=1}^{m}\left\{\begin{array}{c}G'(k, l, A_y(i, j))\\B'_{CbCr}(i-(m-1)/2+\\k-1, j-(m-1)/2+l-1)\end{array}\right\}\right]}{\sum_{k=1}^{m}\sum_{l=1}^{m}G'(k, l, A_y(i, j))} \quad (4)$$

$$g'_{CbCr}(i, j) = \quad (5)$$
$$g'_{CbCr}(i, j) * G(255 - A_y(i, j)) + A_{CbCr}(i, j) * (1 - G(255 - A_y(i, j)))$$

With the arrangement, in the high-brightness region, it is possible to restore a natural color-difference component by reflecting the color-difference component $B'_{CbCr}$ (i, j) of the rearranged image in the color-difference component $g'_{CbCr}$ (i, j) of the synthesized image with a heavier weight.

Similarly, also in the low-brightness region in the "saturated black" state, it is possible to restore a natural color-difference component by reflecting the color-difference component $B'_{CbCr}$ (i, j) of the rearranged image in the color-difference component $g'_{CbCr}$ (i, j) of the synthesized image with a heavier weight.

Here, as represented in FIG. 8, the brightness component and the color-difference component of the through image to be synthesized with the high-resolution image are mapped onto the rearranged image, respectively, and therefore, if the number of through images to be subjected to synthesizing processing increases, the number of pixels mapped in the filter to be subjected to weighted addition when the rearranged image and the high-resolution image are synthesized, and thus the amount of information reflected in the pixel data of the synthesized image increases.

Consequently, by adjusting the filter size m to be applied in synthesizing processing in accordance with the number of through images to be synthesized, it is possible to reduce the burden of processing imposed on image synthesizing processing in the image processing device while maintaining the quality of the synthesized image. For example, when the number of through images to be subjected to synthesizing processing is less than or equal to a predetermined number, a filter size (for example, m=5), which will serve as a reference, is applied, and when the number of through images exceeds the above-described predetermined number, it is possible to suppress the influence of the position alignment error on the quality of the synthesized image while suppressing the increase in the burden of processing due to the increase in the number of through images by reducing the filter size by one level.

By applying the gradation converting curve obtained by the distribution analyzing part 44 and the synthesis controlling part 45 represented in FIG. 11 to the brightness component $g'_y$ (i, j) of the synthesized image obtained as described above, it is possible to restore the change of tone level in the high-brightness region in the "saturated white" state in the high-resolution image by utilizing information contained in the through image and reproduce as a change of tone level (8-bit) after gamma transformation.

As described above, according to the image processing device and the image processing method of the present application, it is possible to selectively apply a proper synthesizing technique while taking into consideration various features including the distribution of tone level in the high-resolution image and the low-resolution image to be subjected to synthesizing processing and the number of images to be subjected to synthesis.

Consequently, with the technique to obtain a high-resolution synthesized image having an expanded dynamic range by synthesizing the high-resolution image obtained by the present shooting and the through image, it is possible to properly reproduce the gradation, neither too much nor too little. For example, in a subject such as cherry blossoms shot with a background of brightly glittering cloud and blue sky can also improve image quality.

Embodiment 3

Figure 15:
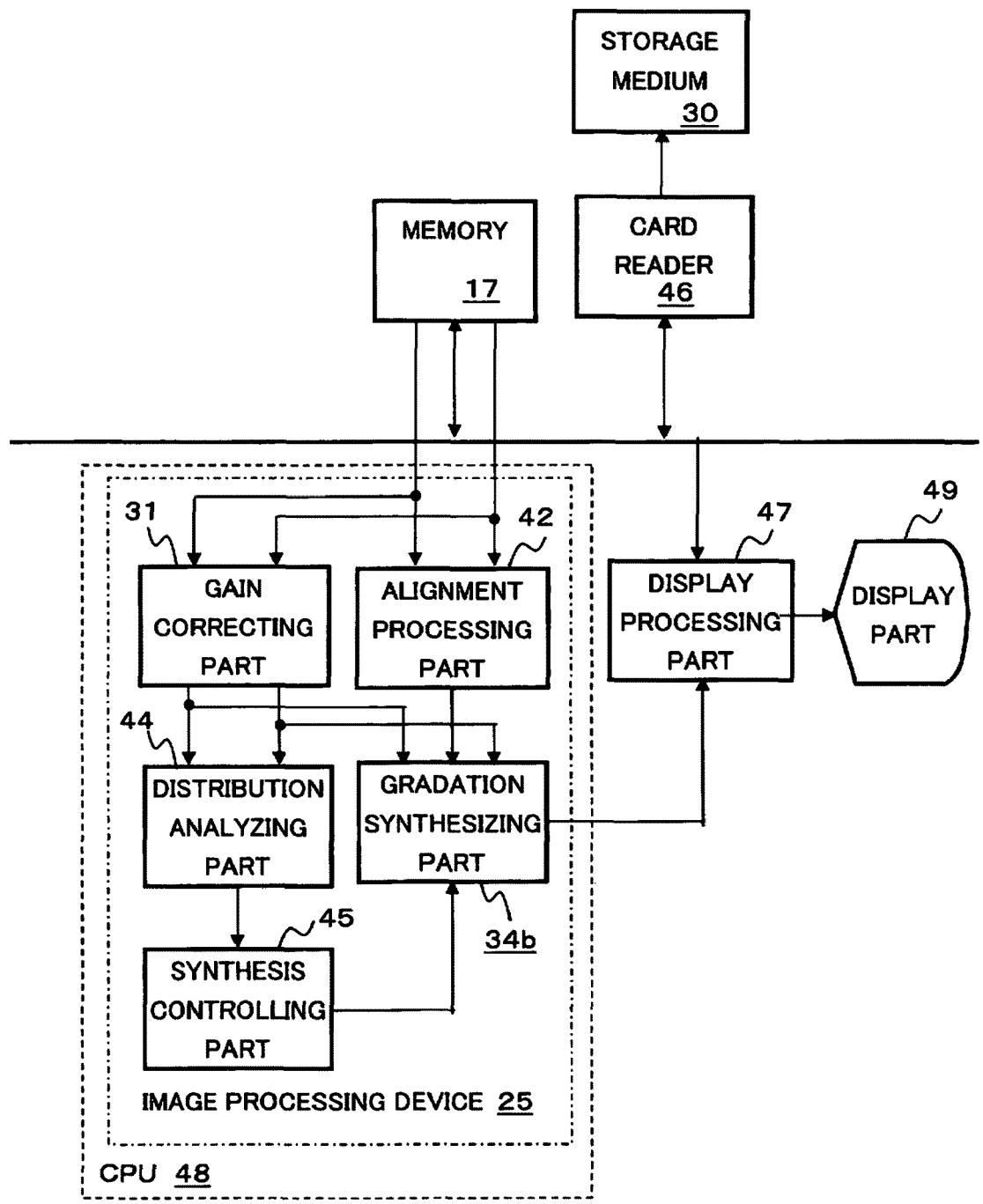
FIG. 15 is a diagram illustrating another embodiment of an image processing device according to the present application.

FIG. 15 represents a third embodiment of an image processing device according to the present application.

Among components represented in FIG. 15, that equivalent to each part represented in FIG. 11 is representing the symbol assigned represented in FIG. 11 and its explanation is omitted.

In a personal computer represented in FIG. 15, a CPU 48 and the memory 17, a card reader 46, and a display processing part 47 are coupled via a bus and the image processing device 25 is realized by a program that causes the CPU 48 to execute processing of each part of the image processing device 25 represented in FIG. 11.

For example, it is possible to selectively apply a proper synthesizing technique and obtain a high-resolution synthesized image having an expanded dynamic range while taking into consideration various features including the distribution of tone level in the high-resolution image and the low-resolution image to be subjected to synthesizing processing and the number of images to be subjected to synthesis by recording through images obtained with one level underexposed and two levels underexposed in the storage medium 30 along with the high-resolution image obtained by the present shooting by a digital camera, reading the image data with the card reader 46 and storing it in the memory 17, and subjecting it to the processing of the image processing device 25.

As described above, by allotting the image processing to synthesize the high-resolution image and the low-resolution image to the personal computer, the processing to be performed on the side of the digital camera can be limited to extraction and recording of image information to be subjected to synthesizing processing, and therefore, it is possible to enable a further faster operation of the digital camera. In addition, it is also possible for a user to confirm the result of image processing described above based on the image displayed on a large, easy-to-see screen by subjecting the synthesized image thus obtained to the display processing by the display processing part 47 and a display part 49 and providing it to the user.

As described above, it is possible to make an attempt to improve the quality of a synthesized image to be obtained finally by selectively applying a proper synthesizing technique that has taken into consideration the features of the high-resolution image and the low-resolution image to be subjected to synthesizing processing in the technique to cause the expansion of the range of reproduced gradation and the high speed of processing to coexist by synthesizing a plurality of low-resolution images with different exposure conditions with the high-resolution image.

Embodiment 4

Figure 16:
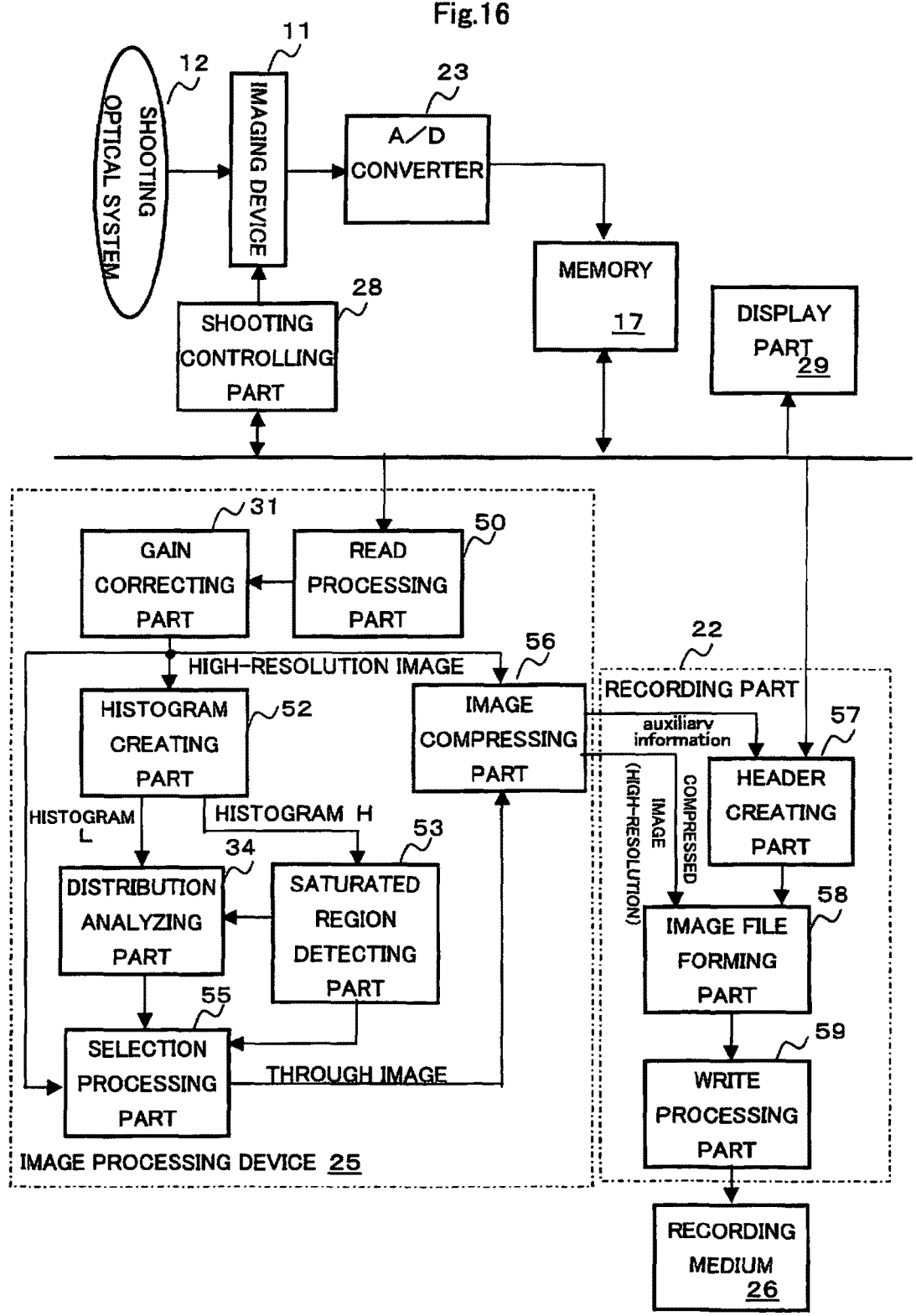
FIG. 16 is a diagram illustrating an embodiment of an image processing device according to the present application.

FIG. 16 represents an embodiment of an image processing device according to the present application.

Among components represented in FIG. 16, those equivalent to the components represented in FIG. 1, FIG. 2, or FIG. 11 are showing the same symbols assigned and their explanation is omitted.

In a digital camera represented in FIG. 16, light formed into a optical image on the imaging device 11 by the shooting optical system 12 when shooting an image is converted into an electric signal in accordance with its intensity by the imaging device 11 and is further converted into digital data by the analog/digital (A/D) converter 23 and stored in the memory 17. The memory 17 represented in FIG. 16 is coupled to the image processing device 25, the display part 29, the recording part 22, and the shooting controlling part 28 relating to the present application via a bus and the shooting controlling part 28 switches the imaging device 11 to the reading mode.

The shooting controlling part 28 represented in FIG. 16 instructs the high resolution mode to the above-described imaging device 11 to read data corresponding to all of the pixels in response to the operation of the release button by a user and the high-resolution image data obtained from the electric signal read by the imaging device 11 in response to this is stored in the memory 17 and, at the same time, subjected to the processing of the image processing device 25. On the other hand, before and after the release button is operated, the shooting controlling part 28 switches the reading mode from the imaging device 11 to the through image mode and in response to this, the low-resolution image data obtained by pixel skipping and pixel data accumulation within the imaging device 11 are subjected to display processing by the display part 29 via the memory 17 and the user is provided with information about the shooting range.

During the period of time in which the above-described through image mode is applied, the low-resolution image data obtained from the output signal of the imaging device 11 obtained under various exposure conditions is stored in the memory 17 and subjected to the processing of the image processing device 25 along with the above-described high-resolution image data. The through images stored in the memory 17 in this manner are the low-resolution images obtained by shooting the same subject as that of the high-resolution image obtained by the present shooting at reduced time intervals.

Hereinafter, the detailed configuration and operation of the image processing device 25 are explained by taking a case as an example, where auxiliary information is created for image synthesizing processing to restore to the original gradation in the saturated white region and the saturated black region that appear in the high-resolution image obtained by the present shooting using a low-resolution image obtained with an exposure value different from the correct exposure applied to the present shooting.

In the image processing device 25 represented in FIG. 16, a read processing part 50 reads the high-resolution image obtained by the present shooting executed in accordance with the release operation by a user and the through image stored corresponding to the high-resolution image from the above-described memory 17 and subjects them to the processing of the gain correcting part 31.

When the high-resolution image or the through image read by the above-described read processing part 50 has already been subjected to gamma transformation, the gain correcting part 31 first performs inverse gamma transformation and then performs gain correction in accordance with the difference in exposure condition between the high-resolution image and the individual through images. Specifically, the gain correcting part 31 performs gain correction by multiplying the tone level of each pixel included in the read through image by a constant in accordance with the ratio between the exposure value applied respectively and the correct exposure, and a histogram creating part 52 creates a histogram relating to the tone level for each image of the result of gain correction.

As described above, it is possible to create a histogram L capable of comparison in a linear space with the distribution (refer to FIG. 13(a)) of pixels in a histogram H of the high-resolution image shot with the correct exposure, instead of the histogram (refer to FIG. 13(b)) of the through image obtained with one level underexposed and the histogram (refer to FIG. 13(d)) of the through image obtained with two levels underexposed by creating the histogram of the through image after the gain correction (refer to FIGS. 13(c), (e)).

The histogram H of the high-resolution image and the histogram L of the through image obtained as described above are subjected to the processing of a saturated region detecting part 53 and the distribution analyzing part 44 represented in FIG. 16, respectively.

The saturated region detecting part 53 analyzes the histogram H of the high-resolution image and finds, for example, the number of pixels that exceed a threshold value corresponding to the upper limit of the tone level and the number of pixels that stay under a threshold value corresponding to the lower limit, respectively, and detects the occurrence of the so-called "saturated white" or "saturated black" region in the high-resolution image based on whether or not the respective numbers of pixels exceed the respective predetermined threshold values, and notifies a selection processing part 55 of the detection result.

The distribution analyzing part 44 represented in FIG. 16 analyzes the histogram of the through image obtained as described above. The distribution analyzing part 44 searches for, for example, a range where more than a predetermined threshold number of pixels are distributed in a high-brightness range, which is equivalent to saturated level when correct exposure is applied (The high-brightness range is more than or equal to the tone level indicated by the broken line in FIG. 13). The searched result is notified to the selection processing part 55 as information that can be utilized for the restoration of the gradation in the high-brightness region. The distribution analyzing part 44 searches for, for example, a range, such as those represented surroundings by the broken line in FIGS. 13(*c*), (*e*), and when detecting such a range, notifies the detection result to the effect that information that can be utilized for the restoration of the gradation in the saturated white region in the high-resolution image is included.

The selection processing part 55 represented in FIG. 16 chooses, when, for example, the saturated region detecting part 53 notifies that a region in which the tone level is saturated is detected in the high-resolution image and the distribution analyzing part 44 notifies the detection result to the effect that the through image includes information that can be utilized for the restoration of the gradation in the saturated white region in the high-resolution image, the through image that includes the above-described information as auxiliary information used in image processing (synthesizing processing) for the high-resolution image, the main image.

The through image thus chosen and the high-resolution image, the main image, are compressed by an image compressing part 56, respectively, and subjected to the processing of the recording part 22.

In the recording part 22 represented in FIG. 16, a header creating part 57 receives auxiliary information including the through image compressed by the above-described image compressing part 56, creates header information including the auxiliary information and shooting information obtained from the shooting controlling part 28 via a bus, and subjects it to the processing of an image file forming part 58.

Figure 17:
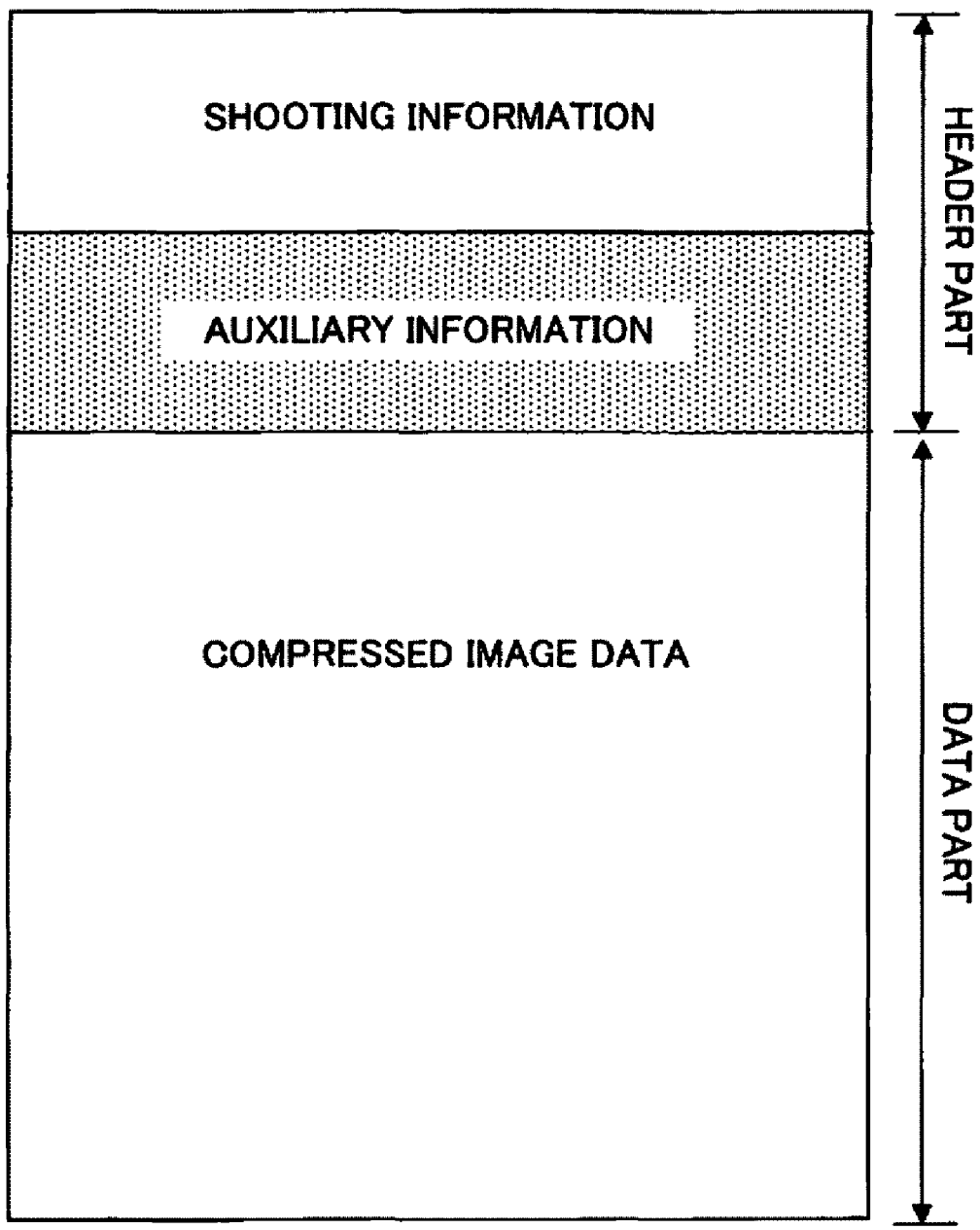
FIG. 17 is a diagram illustrating a configuration of an image file.

As represented in FIG. 17, the image file forming part 58 stores the compressed data of the main image received from the image compressing part 56 in the image data part and to the compressed data, the header created as described above is affixed to form an image file and the image file is written to and stored in a recording medium 26 via a write processing part 59.

As described above, in the digital camera mounting the image processing device according to the present embodiment, when recording the main image in the recording medium, the above-described processing is performed automatically and the through image having information useful for the restoration of the gradation in the high-brightness region or low-brightness region of the main image is affixed as auxiliary information to be subjected selectively to image processing. Consequently, a user is freed from the complicated selection and instruction as to whether or not to perform restoring processing of the gradation by utilizing image synthesis for the region in which the tone level is saturated or which image to be subjected to synthesizing processing, and therefore, it is possible to reduce the work load of a user and the user can devote himself/herself to shooting.

In addition, as described above, it is possible to suppress the increase in the amount of data of the header part in the image file that stores the main image by reducing the amount of data of the through image to be subjected to synthesizing processing by compressing it with the image compressing part 56.

Further, as described above, it is also possible to extract only the pixel data to be utilized directly in the synthesizing processing for the purpose of the restoration of the gradation in the high-brightness region (or the low-brightness region), instead of compressing the entire through image to use it as auxiliary information, and to attach the extracted pixel data to the header of the image file as auxiliary information.

For example, it is possible to extract features from the high-resolution image and the plurality of through images read from the memory 17 in the manner described in detail in the above-mentioned Embodiment 1 and then extract the image data in the region of the through image corresponding to the region in which saturated white or saturated black occurs in the high-resolution image as auxiliary information after correcting the positional shift between them based on the extracted features.

As represented in FIG. 18(*a*) with a hatch, when saturated white occurs at the part of cloud and the sun captured in the high-resolution image, it is possible to considerably reduce the amount of data of auxiliary information by extracting image data of the corresponding regions (represented in FIGS. 18(*b*), (*c*) with a hatch) of the through image obtained with one level underexposed and the through image obtained with two levels underexposed and creating auxiliary information from the extracted image data and information about the above-described positional shift.

Further, when synthesizing the low-resolution through image and the high-resolution main image, it is also possible to carefully choose in units of pixels the image data to be extracted from the through image as auxiliary information by taking into consideration that the rearranged image is formed by rearranging the through image in a pixel space with the same density as that of the main image and that averaging processing using a Gaussian filter with a predetermined size (for example, 5×5 or 3×3) is performed for calculating the brightness value and the color-difference data of each pixel included in the above-described saturated white or saturated black region as represented in FIG. 8.

It is also possible to use, as auxiliary information, a high-resolution image obtained by shooting the same subject at a time slightly different from that of the present shooting by applying a different exposure value, instead of a low-resolution through image. The amount of data of the high-resolution image is equivalent to that of data of the main image obtained by the present shooting, however, as described above, it is possible to suppress the amount of information to be affixed as a header within a practical range by using only the image data in the region to be utilized directly in synthesizing processing as auxiliary information.

Further, it is possible for the header creating part 57 represented in FIG. 16 to insert various kinds of information obtained in the shooting stage into the header to be affixed to the data part of the image file as auxiliary information, not limited to the image or part of the image to be subjected to the above-described image synthesizing processing.

As described above, in secondary disclosed image processing device in the section of MEANS FOR SOLVING PROBLEM, it is possible to form an image file including both the data of the main image to be subjected to image processing and the auxiliary information by automatically choosing data of other images that can be utilized effectively in image processing by a personal computer and attaching it to the data of the main image as auxiliary information.

By recording such an image file in a recording medium, such as a compact flash memory card and an SD card, and subjecting it to sophisticated image processing by a personal computer etc., it is possible to maintain the degree of freedom relating to image processing for image data obtained by a digital camera etc. Further, the need of the selection and instruction of a user as to whether or not to attach auxiliary information at the time of shooting and which image data to be affixed as auxiliary information is obviated, and thus the burden of the user can be reduced.

Embodiment 5

Figure 19:
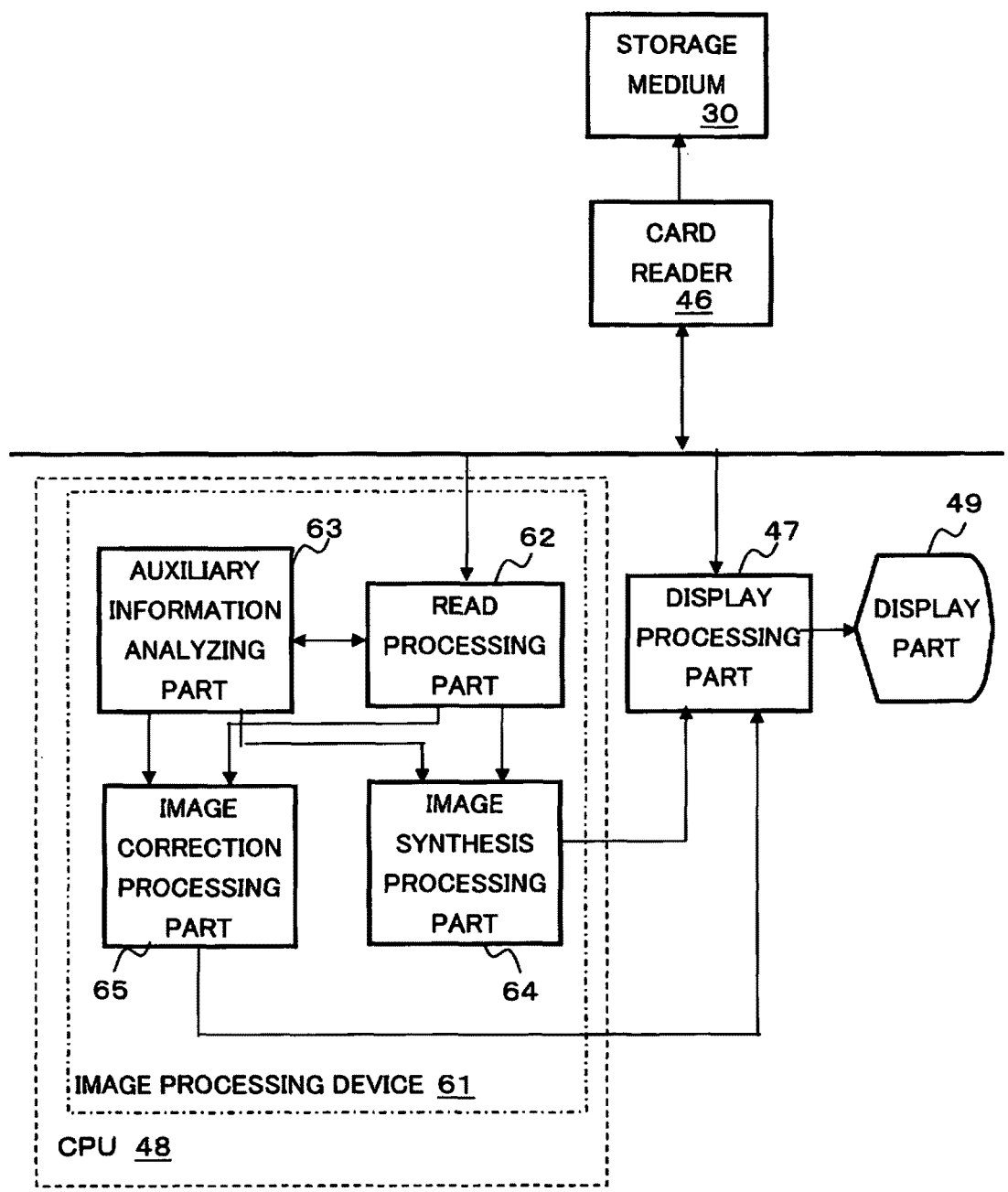
FIG. 19 is a diagram illustrating an embodiment of an image processing method according to the present invention.

FIG. 19 represents an embodiment of an image processing method according to the present application.

Among components represented in FIG. 19, those equivalent to the components represented in FIGS. 1, 2, and 15 are representing the same symbols assigned and their explanation is omitted.

In a personal computer represented in FIG. 19, the CPU 48 is coupled with the card reader 46 and the display processing part 47 via a bus and an image processing device 43 is realized by a program that causes the CPU 48 to execute processing of a read processing part 62, an auxiliary information analyzing part 63, an image synthesis processing part 64, and an image correction processing part 65, to be described later.

The read processing part 62 represented in FIG. 19 reads an image file (refer to FIG. 17) stored in the recording medium 30 via the card reader 46 and subjects the header part included in the image file to analyzing processing of the auxiliary information analyzing part 63.

The auxiliary information analyzing part 63 analyzes auxiliary information included in header information, determines the kind of image processing to which the auxiliary information is applied, and instructs the read processing part 62 on the destination to which to send image data stored in the data part of the image file, and at the same time, delivering proper auxiliary information to the destination of the image data.

For example, when a through image with a different exposure value is recorded as auxiliary information of the header part represented in FIG. 17, the auxiliary information analyzing part 63 determines that it is the auxiliary information to be used in synthesizing processing for restoring the gradation in the region where the tone level of pixel is saturated and instructs the read processing part 62 to send image data to the image synthesis processing part 64, and at the same time, sending the through image data included in the auxiliary information to the image synthesis processing part 64.

In response to this, the image synthesis processing part 64 performs image synthesizing processing using the technique disclosed in the above-described Embodiment 1, and thereby, it is possible to obtain a high-resolution synthesized image having an expanded dynamic range by causing the image synthesis processing part 64 to automatically execute image synthesizing processing by utilizing a proper low-resolution image in accordance with the specification of the main image to be processed.

The synthesized image obtained in this manner is subjected to display processing by the display processing part 47 and the display part 49 and provided to a user, and therefore, it is possible for the user to confirm the above-described result of image processing based on the image displayed on a large, easy-to-see screen.

As described above, according to the embodiment of the image processing method of the present application, proper image processing is automatically applied to the main image stored in the image file by utilizing auxiliary information based on the auxiliary information included in the image file instructed to be read. Consequently, a user is required only to instruct to read the image file that stores the main image to be subjected to image processing and it is not necessary for the user to perform complicated task, such as to specify the image file that stores another image to be synthesized with the main image.

Similarly, it is possible to subject the image data and auxiliary information included in the image file to proper image processing by discriminating the auxiliary information applied to various kinds of image processing with the auxiliary information analyzing part 63.

As represented in FIG. 19, by causing a computer to execute the program that realizes the secondary disclosed image processing method in the section of MEANS FOR SOLVING PROBLEM, it is possible to perform proper image processing for the main image data by utilizing the auxiliary information read from the image file recorded by the image processing device having the configuration represented in FIG. 16.

At this time, it is possible for the user to perform image processing using proper auxiliary information only by specifying the image file that stores the image data to be subjected to image processing, and therefore, the workload of the user can be reduced.

The present application can be embodied in other forms without departing from the spirit and its essential features. Therefore, the above-described embodiments are only examples in all respects and should not be interpreted as limitative. The scope of the present application is indicated by the scope of claims and not restricted by the present specification. Further, all of the modifications and alterations included in the equivalent scope of claims should be included in the scope of the present application.

INDUSTRIAL APPLICABILITY

As described above, according to the image processing device, the image processing method, and the image processing program of the present application, it is possible to obtain an excellent effect for expanding gradation by synthesizing a high-resolution image and at least one low-resolution image, and therefore, the present application is very useful in an image processing device incorporated in an electronic camera and an image processing device realized by causing a personal computer to execute an image processing program.

In particular, when a high-resolution image and a low-resolution image obtained by changing exposure conditions are used by applying it to an electronic camera, it is possible to shorten the period of time during which a user has to fix a camera angle and enable shooting with expanding gradation more easily than before by utilizing that the read time of the low-resolution image is short.

Further, when applying a technique to synthesize a high-resolution image and a low-resolution image, it is possible to improve the quality of a high-resolution image having an expanded dynamic range obtained by synthesizing processing by properly controlling a technique to synthesize a low-resolution image. Consequently, it is made possible to apply a technique to expand gradation by image synthesis in applications in which a high image quality is required.

Furthermore, by providing a technique that considerably reduces workload of a user when applying image processing with high degree of freedom using a personal computer to image data obtained by an imaging device, such as a digital camera, it is made possible to provide an image of high quality to which a sophisticated image processing function has been applied even to a user who tends to avoid complicated operations and remarkably improve the service level for the user, and therefore, this is very useful in the field of an imaging device and image processing device, such as a digital camera.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device, comprising:
an image inputting part taking in at least one of a plurality of low-resolution images and a high-resolution image obtained by shooting the same subject while changing exposure condition;
a shift detecting part detecting a positional shift of pictorial pattern between each of the plurality of low-resolution images and the high-resolution image; and
a gradation expanding part generating a synthesized image in which a range of reproduced gradation is expanded by performing position alignment between each of the plurality of low-resolution images and the high-resolution image based on the positional shift, extracting gradation information of the plurality of low-resolution images, and synthesizing the plurality of low-resolution images with the high-resolution image.

2. The image processing device according to claim 1, wherein
the image inputting part takes in two or more low-resolution images; and
the gradation expanding part synthesizes the gradation information of low-resolution represented by each of the plurality of low-resolution images with the high-resolution image in a multiplexing manner.

3. The image processing device according to claim 1, wherein
the shift detecting part comprises:
a phase dividing part generating a plurality of pieces of sampling information with sample positions shifted from one another by extracting an edge component of pictorial pattern from the high-resolution image and performing sub-sampling of the edge component while shifting phases; and
a precisely detecting part detecting a positional shift with a finer precision than a pixel interval of the low-resolution images by detecting the positional shift with which the pictorial pattern best matches between each of the plurality of low-resolution images and the plurality of pieces of sampling information.

4. The image processing device according to claim 1, wherein
the gradation expanding part:
determines a high-brightness region and a low-brightness region of the high-resolution image;
increases a synthesis ratio of one or more low-resolution images underexposed as to the high-brightness region of the high-resolution image; and
increases a synthesis ratio of one or more low-resolution images overexposed as to the low-brightness region of the high-resolution image.

5. The image processing device according to claim 1, wherein
the gradation expanding part comprises:
an adjusting unit adjusting a tone level of a corresponding pixel of a synthesized image by reflecting a tone level of each pixel included in at least one of the low-resolution images chosen from the plurality of low-resolution images and a tone level of corresponding pixel of the high-resolution image; and
a controlling unit controlling adjusting processing of the tone level of each pixel of the synthesized image by the adjusting unit based on at least one of the followings, a histogram of the tone level obtained for each of the plurality of low-resolution images, a histogram of the tone level obtained for the high-resolution image, and the number of the low-resolution images acquired by the image inputting part.

6. The image processing device according to claim 5, wherein
the controlling unit comprises:
an analyzing unit analyzing a distribution of pixels in a predetermined range of tone levels as to the histogram of the tone level obtained for each of the plurality of low-resolution images and the histogram of the tone level of the high-resolution image; and
a converting curve fitting unit adjusting a gradation converting curve used to confine the tone level of each pixel of the synthesized image within a predetermined range in the adjusting unit based on the analysis result by the analyzing unit.

7. The image processing device according to claim 5, wherein
the controlling unit comprises:
an analyzing unit analyzing a distribution of pixels in a predetermined range of tone levels as to the histogram of the tone level obtained for each of the plurality of low-resolution images and the histogram of the tone level of the high-resolution image; and
a choosing unit choosing at least one of the low-resolution images to be used in adjusting processing by the adjusting unit based on the analysis result by the analyzing unit.

8. The image processing device according to claim 5, wherein
the controlling unit comprises a range determining unit determining the size of a region of low-resolution images to be reflected in the adjustment of the tone level of each pixel included in the synthesized image by the adjusting unit in accordance with the number of low-resolution images to be used in synthesizing processing by the adjusting unit.

9. The image processing device according to claim 5, wherein
the controlling unit comprises:
a brightness weight determining unit determining a brightness weight to be applied when reflecting a brightness component, which corresponds to the pixel of at least one of the low-resolution images chosen, to a brightness component of each pixel included in the synthesized image by the adjusting unit; and
a color-difference weight determining unit determining a color-difference weight to be applied when reflecting a color-difference component, which corresponds to the pixel of at least one of the low-resolution image chosen, to a color-difference component of each pixel included in the synthesized image by the adjusting unit, wherein
the color-difference weight determining unit comprises a weight adjusting unit adjusting a value of the color-difference weight in accordance with the magnitude of a color-difference component corresponding to each pixel of the high-resolution image.

10. An electronic camera, comprising:
the image processing device according to claim 1; and
an imaging part shooting a subject with at least two kinds of resolution, wherein
the high-resolution image processed by the image processing device is a still image of the high-resolution shot by the imaging part, and
the image processing device processes at least one of the plurality of low-resolution images shot by the imaging part before and/or after the shooting of the still image with the exposure condition different from the high-resolution image.

11. The electronic camera according to claim 10, comprising a monitor part displaying an image, wherein
the imaging part:
sequentially shoots low-resolution through images, through images are images obtained by pixel skipping to provide moving images for view finder, and displays a moving image on the monitor part; and
shoots a plurality of low-resolution images with timing not synchronizing the shooting of the through images and under the exposure condition different from the high-resolution image.

12. A non-transitory computer readable medium storing an image processing program capable of instructing a computer to function as the image processing device according to claim 1.

13. An image processing method, comprising:
an image inputting step for acquiring a plurality of low-resolution images obtained by shooting the same subject under a plurality of exposure conditions with an imaging unit shooting images of the subject with a plurality of different resolutions and a high-resolution image obtained by shooting the subject under a correct exposure condition with the imaging unit; and
a synthesizing step for synthesizing at least one of the low-resolution images chosen from the plurality of low-resolution images and the high-resolution image, and generating a synthesized image having a resolution equivalent to the high-resolution image, wherein
the synthesizing step comprises:
an adjusting step for adjusting a tone level of a corresponding pixel of the synthesized image by reflecting a tone level of each pixel included in at least one of the low-resolution images chosen and a tone level of corresponding pixel of the high-resolution image; and
a controlling step for controlling adjusting processing of the tone level of each pixel of the synthesized image in the adjusting step based on at least one of the followings, a histogram of a tone level obtained for each of the plurality of low-resolution images, a histogram of a tone level obtained for the high-resolution image, and the number of the low-resolution images acquired in the image inputting step.

* * * * *